United States Patent [19]
Daggett

[11] Patent Number: 4,868,472
[45] Date of Patent: Sep. 19, 1989

[54] COMMUNICATION INTERFACE FOR MULTI-MICROPROCESSOR SERVO CONTROL IN A MULTI-AXIS ROBOT CONTROL SYSTEM

[75] Inventor: Kenneth E. Daggett, Murrysville, Pa.

[73] Assignee: Unimation Inc., Danbury, Conn.

[21] Appl. No.: 180,703

[22] Filed: Apr. 5, 1988

Related U.S. Application Data

[63] Continuation of Ser. No. 932,992, Nov. 20, 1986, abandoned.

[51] Int. Cl.⁴ ............................................. G06F 15/46
[52] U.S. Cl. .......................... 318/568.2; 318/568.23; 318/567; 318/575; 364/513; 901/35; 901/46
[58] Field of Search ................... 318/563–567, 318/568 R, 568 L, 568 M, 560, 565, 566, 567, 574, 570, 571, 572, 573, 575, 576, 577; 364/478, 513, 169, 167.01, 174; 901/19, 20, 22, 23, 24, 35, 46

[56] References Cited

U.S. PATENT DOCUMENTS

| | | | |
|---|---|---|---|
| 3,970,830 | 7/1976 | White et al. | 364/131 X |
| 4,068,156 | 1/1978 | Johnson et al. | 318/575 |
| 4,308,584 | 12/1981 | Arai | 364/513 |
| 4,467,436 | 8/1984 | Chance et al. | 364/513 |
| 4,503,507 | 3/1985 | Takeda et al. | 364/131 X |
| 4,514,814 | 4/1985 | Evans | 364/132 X |
| 4,523,135 | 6/1985 | Kogawa | 318/565 |
| 4,543,639 | 9/1985 | Inaba et al. | 364/513 |
| 4,549,276 | 10/1985 | Inaba et al. | 364/513 |
| 4,580,207 | 1/1986 | Arai et al. | 364/138 |
| 4,587,605 | 5/1986 | Kouyama et al. | 364/131 X |
| 4,598,380 | 7/1986 | Holmes et al. | 364/167.01 X |
| 4,611,296 | 9/1981 | Niedermayr | 364/138 X |
| 4,623,971 | 11/1986 | Ailman et al. | 364/513 |
| 4,629,955 | 12/1986 | French et al. | 364/167.01 X |
| 4,631,689 | 12/1986 | Arimura et al. | 364/513 |
| 4,663,730 | 5/1987 | Ikeda | 364/132 X |
| 4,675,803 | 6/1987 | Kendall et al. | 364/131 |
| 4,677,433 | 6/1987 | Cattin et al. | 314/131 X |
| 4,682,089 | 7/1977 | Tamari | 318/565 X |
| 4,698,777 | 10/1987 | Toyoda et al. | 364/513 |
| 4,718,078 | 1/1988 | Bleidorn et al. | 364/513 X |

Primary Examiner—William M. Shoop, Jr.
Assistant Examiner—Paul Ip

[57] ABSTRACT

A servo control operates in a control loop for a robot control system and performs control support tasks and calculation tasks for the control loop for all of the robot joint motors. The servo includes first and second microprocessors. The first microprocessor performs calculation tasks including the computation of output control commands from stored algorithms for the one control loop for each joint motor. The second microprocessor supervises the operation of the servo control and performs servo control support tasks in the one control loop for each joint motor including the routing of control command, status and feedback data to and from the first microprocessor.

A communication interface couples the first and second microprocessors so as to enable the servo control to operate the one control loop for each joint motor and control the controlled variable for the one control loop.

The communication interface includes a first memory bank and a second memory bank. The first microprocessor is coupled to one of the banks to write command and feedback data thereto and to read calculated control data therefrom. The second microprocessor is coupled to the other of the banks to read command and feedback data therefrom and to write calculated control data thereto.

The microprocessors and the memory banks are cross-switched at the control sampling rate so that the first microprocessor can supply new control calculations for control loop operation based on new control commands and feedback data in each control cycle.

7 Claims, 25 Drawing Sheets

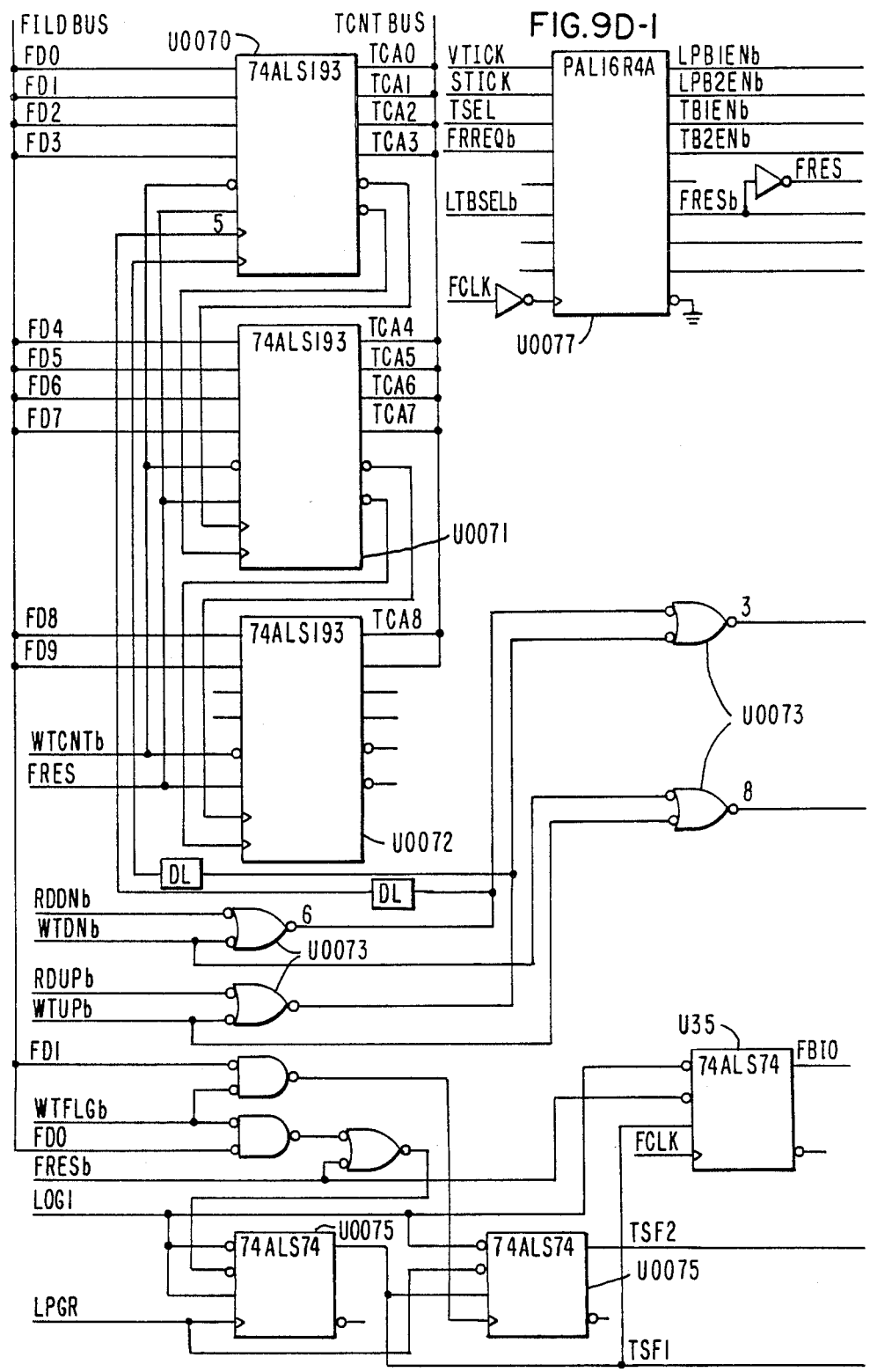

COMMUNICATION INTERFACE FOR MULTI-MICROPROCESSOR SERVO CONTROL IN A MULTI-AXIS ROBOT CONTROL SYSTEM

This application is a continuation of application Ser. No. 06/932,992 filed Nov. 20, 1986.

CROSS REFERENCE TO RELATED APPLICATIONS

The following concurrently filed patent applications, each filed on Nov. 20, 1986, are related to the disclosure of the present application, assigned to the present assignee and are hereby incorporated by reference:

U.S. Ser. No. 932,975 entitled DIGITAL ROBOT CONTROL HAVING AN IMPROVED CURRENT SENSING SYSTEM FOR POWER AMPLIFIERS IN A DIGITAL ROBOT CONTROL and filed by Kenneth E. Daggett, Leonard C. Vercellotti, Richard A Johnson, Richard J. Casler and Eimei Onaga.

U.S. Ser. No. 932,841 entitled DIGITAL ROBOT CONTROL HAVING AN IMPROVED PULSE WIDTH MODULATOR and filed by Kenneth E. Daggett.

U.S. Pat. No. 4,763,055 entitled DIGITAL ROBOT CONTROL HAVING HIGH PERFORMANCE SERVO CONTROL SYSTEM and filed by Kenneth E. Daggett, Richard J. Casler and Eimei Onaga.

U.S. Ser. No. 932,974 entitled DIGITAL ROBOT CONTROL PROVIDING PULSE WIDTH MODULATION FOR A BRUSHLESS DC DRIVE and filed by Kenneth E. Daggett, Richard A. Johnson, Eimei Onaga and Richard J. Casler.

U.S. Ser. No. 932,853 entitled IMPROVED POSITION AND VELOCITY FEEDBACK SYSTEM FOR A DIGITAL ROBOT CONTROL and filed by Kenneth E. Daggett, Richard J. Casler and Eimei Onaga.

U.S. Ser. No. 932,982 entitled UNIVERSAL ROBOT CONTROL BOARD CONFIGURATION and filed by Richard J. Castler, Eimei Onaga, Vincent P. Jalbert, Barrett Booth, and Kenneth E. Daggett.

U.S. Ser. No. 932,991 entitled BASIC DIGITAL MULTIAXIS ROBOT CONTROL HAVING MODULAR PERFORMANCE EXPANSION CAPABILITY and filed by Kenneth E. Daggett, Barrett Booth, Eimei Onaga and Richard J. Casler.

U.S. Pat. No. 4,786,847 entitled IMPROVED DIGITAL CONTROL FOR MULTIAXIS ROBOTS and filed by Kenneth E. Daggett, Richard J. Casler, Eimei Onaga, Barrett Booth, Rajan Penkar, Leonard C. Vercellotti and Richard A. Johnson.

U.S. Ser. No. 932,983 entitled MODULAR ROBOT CONTROL SYSTEM and filed by Kenneth E. Daggett, Barrett Booth, Vincent P. Jalbert, Eimei Onaga and Richard J. Casler.

U.S. Ser. No. 932,977 entitled MULTIPROCESSOR TORQUE SERVO CONTROL FOR MULTIAXIS DIGITAL ROBOT CONTROL SYSTEM and filed by Kenneth E. Daggett, Richard J. Casler and Eimei Onaga.

U.S. Ser. No. 932,990 entitled MULTIPROCESSOR POSITION/VELOCITY SERVO CONTROL FOR MULTIAXIS DIGITAL ROBOT CONTROL SYSTEM and filed by R. Lancraft, Eimei Onaga, Richard J. Casler, Kenneth E. Daggett and Barrett Booth.

U.S. Pat. No. 4,829,219 entitled MULTIAXIS ROBOT HAVING IMPROVED MOTION CONTROL THROUGH VARIABLE ACCELERATION/DECELERATION PROFILING and filed by Rajan Penkar.

U.S. Pat. No. 4,774,445 entitled MULTIAXIS ROBOT CONTROL HAVING CAPABILITY FOR EXECUTING TIMED MOVES and filed by Rajan Penkar.

U.S. Pat. No. 4,772,831 entitled MULTIAXIS ROBOT CONTROL HAVING IMPROVED CONTINUOUS PATH OPERATION and filed by Rajan Penkar.

U.S. Pat. No. 4,773,025 entitled MULTIAXIS ROBOT CONTROL HAVING FITTED CURVED PATH CONTROL and filed by Rajan Penkar and Timothy Skewis.

U.S. Ser. No. 932,973 entitled MULTIAXIS ROBOT CONTROL HAVING IMPROVED ENERGY MONITORING SYSTEM FOR PROTECTING ROBOTS AGAINST JOINT MOTOR OVERLOAD and filed by Eimei Onaga.

U.S. Pat. No. 4,807,153 entitled MULTIAXIS DIGITAL ROBOT CONTROL HAVING A BACKUP VELOCITY MONITOR AND PROTECTION SYSTEM and filed by Eimei Onaga.

BACKGROUND OF THE INVENTION

The present invention relates to digital multi-axis robot controls and more particularly to interface systems for microprocessors coordinated to operate as a servo controller within the robot control looping.

In a multi-axis robot control, a significant amount of mathematical processing capability is required in a single control microprocessor for the implementation of servo control calculations at any one control loop level in the respective control channels for the robot axes. The total processing capability needed for all control levels in all of the axis control channels is extensive.

Generally, commercially available microprocessors have inadequate processing capability to meet the needs of multi-axis robot control. Therefore, multiple interactive microprocessors need to be harnessed to meet the needs of multi-axis robot control. A completely digital robot control employing interactive microprocessors and providing improvement in robot performance and robot control with cost effectiveness and manufacturing economy is disclosed in the referenced copending applications.

As disclosed in U.S. Pat. No. 4,763,055, a microprocessor servo control is configured with a first microprocessor having high data processing capability and a digital signal processor having high computational capability. In coordinated operation controlled by the first microprocessor, the two processors provide more than adequate servo control processing capability in a multi-axis robot control system.

In the referenced and other multi-microprocessor control configurations, provision has to be made, and preferably efficiently made, for implementing inter-microprocessor communication. Thus, in a paired microprocessor arrangement, command information and data must be transferred from the controlling microprocessor to the slave microprocessor, status information and data must be transferred from the slave microprocessor to the controlling microprocessor and provision must be made for interfacing upward and downward control communications with the inter-microprocessor interface.

In the case of digital signal processors and other cases where operations in one of the microprocessors cannot be suspended, inter-processor communication schemes have typically required direct intervention by both microprocessors in the communication task. Such administrative overhead can consume a significant portion of available processing capability and thereby tend to defeat the purpose in using multi-processors in the first place.

SUMMARY OF THE INVENTION

A digital control is provided for a robot having a plurality of joints each driven by an electric motor. Respective feedback control loop means respectively control power amplifiers for the respective joint motors.

At least one control loop operates to control the associated power amplifier and thereby control at least one loop variable selected from position, velocity and torque. A servo control means performs control support tasks and calculation tasks for the control loop for all of the joint motors, and it includes first and second microprocessors. The first microprocessor performs calculation tasks including the computation of output control commands from stored algorithms for the one control loop for each joint motor. The second microprocessor supervises the operation of the servo control means and performs servo control support tasks in the one control loop for each joint motor including the routing of control command, status and feedback data to and from the first microprocessor.

Communication means interfaces the first and second microprocessors relative to each other and relative to higher and lower level control circuitry so as to enable the servo control means to operate the one control loop for each joint motor and control the controlled variable for the one control loop.

The communication interfacing means includes a first memory bank and a second memory bank. Means are provided for coupling the first microprocessor to one of the banks to write command and feedback data thereto and to read calculated control data therefrom and for coupling the second microprocessor to the other of the banks to read command and feedback data therefrom and to write calculated control data thereto.

Means are provided for cyclically cross-switching said microprocessors and said banks at the control sampling rate so that the first microprocessor can supply new control calculations for control loop operation based on new control commands and feedback data in each control cycle.

BRIEF DESCRIPTION OF THE DRAWINGS

FIGS. 6A-1, A-2 shows a more detailed schematic diagram of the servo control of FIG. 5 as embodied on a torque processor (TP) board included in the electronic robot control board configuration shown in FIG. 4;

FIGS. 7A1-7D2 show circuitry employed for the TP board embodiment of FIG. 6;

FIGS. 8A-1, A-2 show a schematic diagram of the servo control of FIG. 5 as implemented in another embodiment on a servo control (SCM) board included in the electronic robot control board configuration shown in FIG. 4; and FIGS. 9A1-9D2 show circuitry employed for the SCM board embodiment of FIG. 8.

DESCRIPTION OF THE PREFERRED EMBODIMENT ROBOTS—GENERALLY

Robot capabilities generally range from simple repetitive point-to-point motions to complex motions that are computer controlled and sequenced as part of an integrated manufacturing system. In factory applications, robots can perform a wide variety of tasks in various manufacturing applications including: die casting, spot welding, arc welding, investment casting, forging, press working, spray painting, plastic molding, machine tool loading, heat treatment, metal deburring, palletizing, brick manufacturing, glass manufacturing, etc. For more complete consideration of robots and their uses, reference is made to a book entitled "Robotics In Practice" published in 1980 by Joseph F. Engelberger.

To perform work within its sphere of influence, a robot typically is provided with an arm, a wrist subassembly and an end effector. The coordinate system employed for the robot arm typically is Cartesian, cylindrical, polar or revolute. Generally, three motion axes are employed to deliver the wrist subassembly anywhere within the sphere of influence and three additional motion axes are employed for universal orientation of the end effector. A drive system is used for each motion axis, and it may be electrical, hydraulic or pneumatic.

PUMA ROBOT

Figure 1:
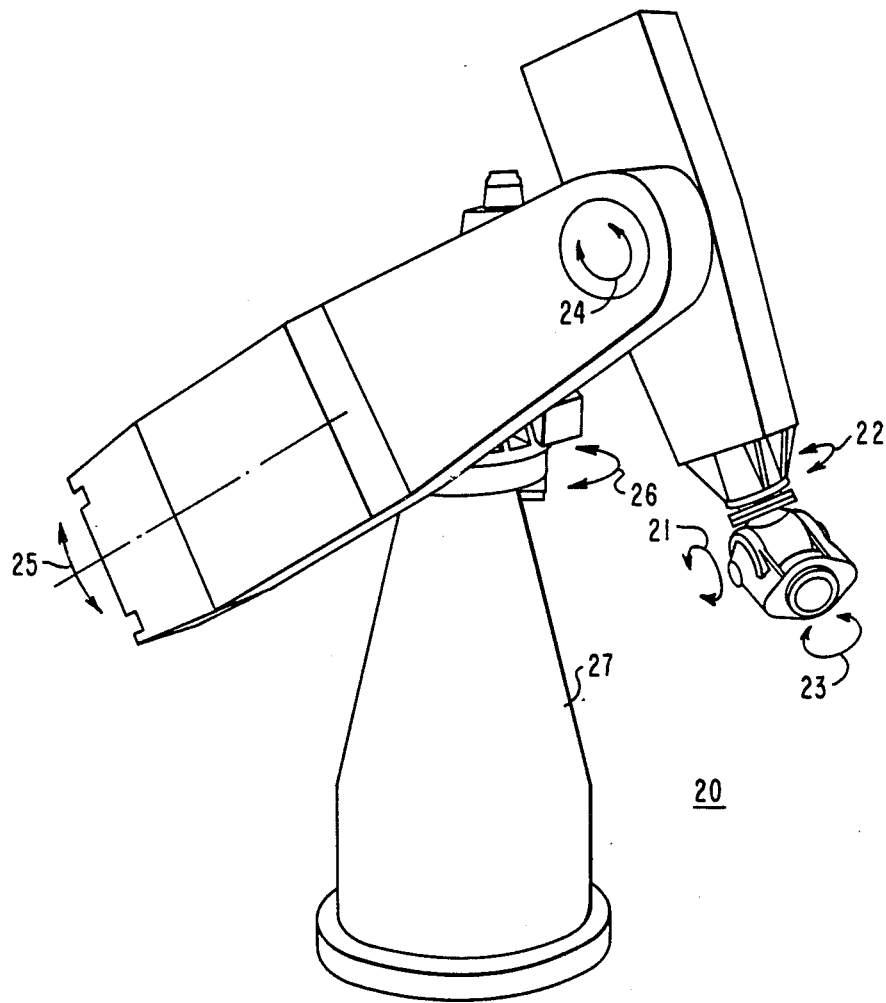
FIG. 1 shows a perspective view of a robot which is operated with more advanced and more accurate performance when controlled by a system making use of the invention.

More particularly, there is shown in FIG. 1 a six-axis industrial electric robot 20 which is illustrative of a wide variety of robots that can be operated in accordance with the principles of the invention. The robot 20 is a relatively powerful electric robot sold by Unimation Company, a wholly-owned company of the present assignee, under the trade name UNIMATE PUMA SERIES 700. The Model 761 PUMA has a 22 pound payload capacity and a reach of 59.1 inches. The Model 762 PUMA has a 44 pound payload capacity and a reach of 49.2 inches.

PUMA 700 Series robots are designed with flexibility and durability to ensure long life and optimum performance in even the harshest, most demanding manufacturing environments. Specific customer needs for either higher payload or extended reach determine which model is suitable for a particular task.

With its longer reach, the PUMA 761 is ideally suited for precise, repetitive tasks such as arc welding and sealant dispensing. The PUMA 762 performs highprecision material handling, machine loading, inspection, testing, joining and assembly in medium and heavier weight applications. The PUMA robots occupy minimal floor space, yet a large work envelope allows the robots to service multiple machines and work surfaces.

Each axis motion is generated by a brush type DC electric motor, which axis position feedback generated by incremental encoders. As shown, the wrist is provided with three articulations, i.e., an up/down rotation indicated by arrow 21 and a left/right rotation indicated by arrow 22 and a third arm motion indicated by arrow 23. Elbow and shoulder rotations in the up/down direction are respectively indicated by arrows 24 and 25. Finally, a left/right arm rotation on a base 27 is indicated by arrow 26.

ROBOT CONTROL

The present invention is directed to a robot control 30 (FIGS. 2, 3, or 4) which can operate the robot 20 of FIG. 1 and other robots including the larger Unimation 860 robot which employs brushless DC axis motors and absolute position feedback. Generally, however, the robot control 30 is universally and flexibly applicable to differing kinds and sizes of robots in stand alone or robotic network operation.

As a result of its universality, the control 30 can be arranged to operate a complete family of robots. Thus, all hydraulically and electrically driven robot arms manufactured by Unimation, a company of Westinghouse, assignee of the present invention, can be operated by the control 30. The key to the family usage, or more generally the universality of the control 30 lies in modularization and in minimizing the use of arm dependent hardware and avoiding the use of any arm dependent hardware in as much of the modular control structure as possible. The robot control 30 is identified by the acronym UNIVAL and operates with completely digital servo control to provide better robot performance with lower cost.

CONTROL LOOPS

Figure 2:
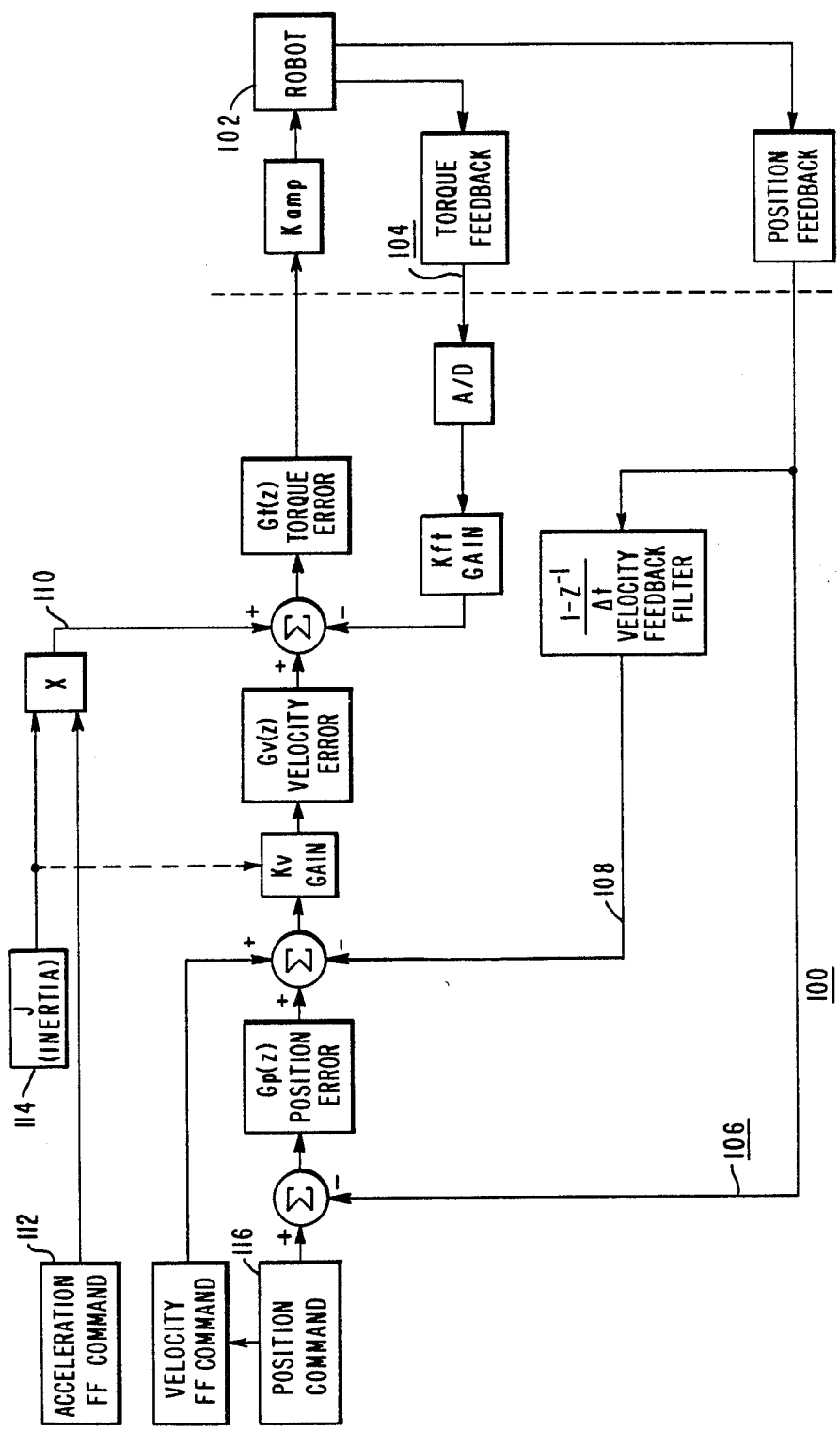
FIG. 2 shows a generalized block diagram of a control loop arrangement employing position, velocity and torque control loops in which the invention may be embodied.

In FIG. 2, there is shown an embodiment of a generalized control loop configuration 100 employable in the UNIVAL TM robot control. Thus, each robot arm joint motor 102 is operated by a torque control loop 104. An outer position control loop 106 is tandem connected to a velocity control loop 108 which in turn drives the torque control loop 104. A feedforward acceleration control loop 110 is responsive to acceleration command 112 and arm and load inertia 114 is also directly coupled to the input of the torque control loop 104. The robot arm is operated by the control loop 100 in accordance with a robot program through a stream of program position commands 116 applied to the position control loop.

Figure 3:
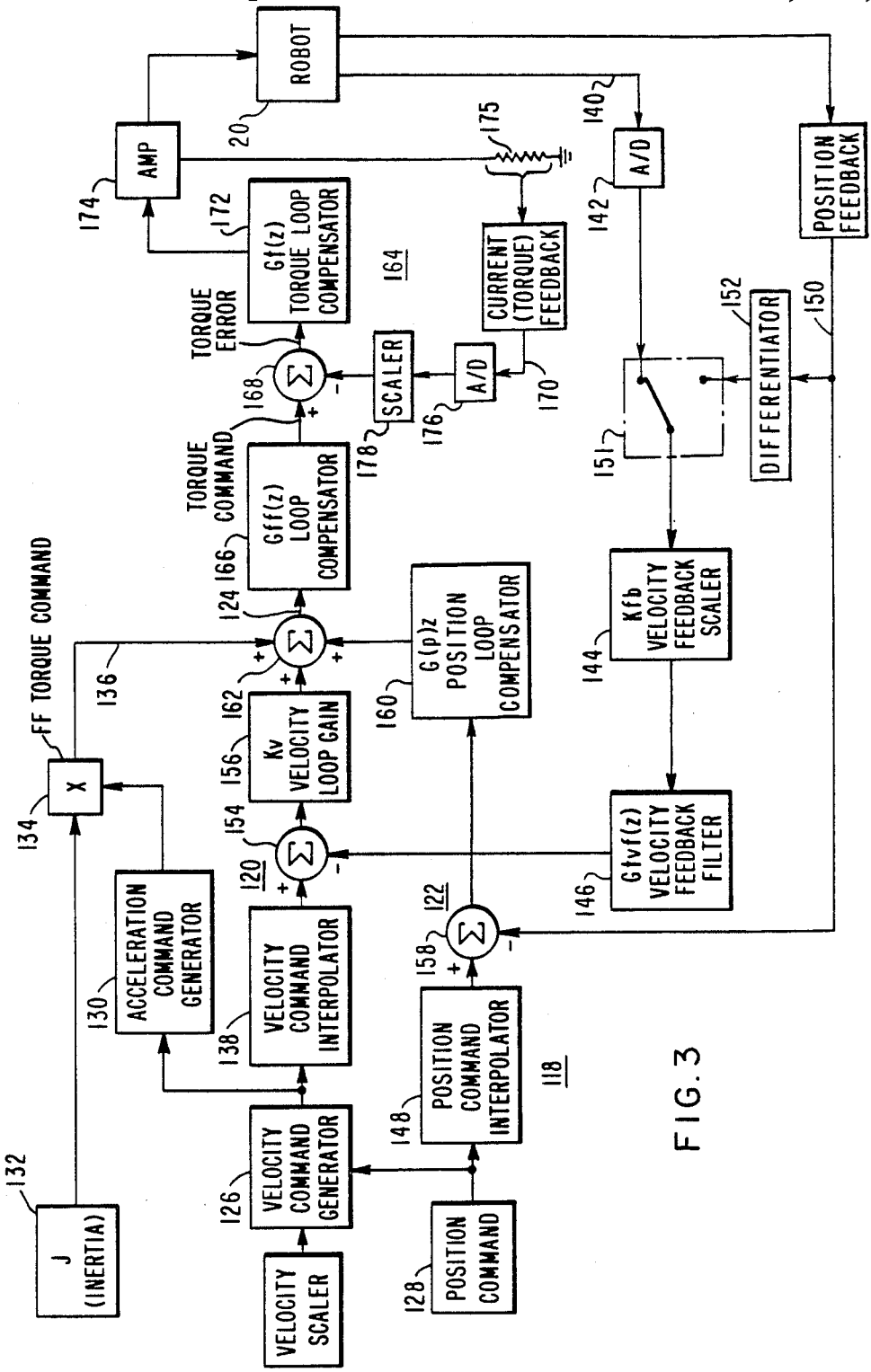
FIG. 3 shows a more detailed block diagram of a control loop arrangement employing position, velocity and torque control loops in which the invention preferably is embodied.

FIG. 3 shows the preferred generalized control loop configuration 118 presently employed in the UNIVAL TM robot control. It is preferably implemented as a completely digital control. With the provision of hierarchical architecture and multiprocessor architecture and floating point hardware as described herein or in other patent applications referenced above, the trajectory cycle can be characterized with a cycle time in the range of 32 to 8 milliseconds depending on the employed modular configuration.

In the preferred control loop arrangement 118, position control loop 122 and velocity control loop 120 are parallel fed to the input of a torque control loop 124. Velocity commands are generated by block 126 from position commands received by block 128. In turn, feedforward acceleration commands are generated by block 130 from the velocity commands. Computed inertia (load and arm) 132 is multiplied against the acceleration command as indicated by reference character 134 in the feedforward acceleration control loop 136.

In the velocity loop 120, the velocity command in the present embodiment is generated once every 8 to 32 milliseconds depending on the modular configuration of the robot control. The basic robot control described subsequently herein has a trajectory cycle time of 32 milliseconds while the enhanced contact has a trajectory cycle of 8 milliseconds.

In any case, a velocity command generator 138 interpolates velocity commands at the rate of 1 each millisecond which corresponds with the velocity feedback sampling rate in velocity feedback path 140. As shown, velocity feedback for a Unimation 860 robot is produced by tachometer signals which are converted from analog to digital by converter 142. A scaler 144 and a filter 146 supplement the velocity feedback circuitry.

Similarly, in the position control loop 122, an interpolator 148 generates position commands every millisecond in correspondence with the position feedback sampling rate in feedback path 150. In the Unimation 860 robot control, position feedback is absolute and the velocity and position feedback paths 140 and 150 operate as just described (with switch 151 as shown). For Unimation PUMA robots, tachometers are not available and velocity feedback is computed from incremental position feedback as indicated by block 152 (with the switch 151 swinging to its other position) as described more fully in referenced applications Ser. No. 932,990

Velocity error is generated by summer 154 with gain applied by loop 156. Similarly, position error is generated by summer 158 with gain applied by box 160.

Velocity and position errors and feedforward acceleration command are summed in summer 162. Gain is applied in box 166 to generate a torque command which is applied to the input of torque control loop 164 every millisecond. Torque error is generated in summer 168 by summing the torque command (motor current command) with current feedback from feedback path 170. Box 172 applies a torque loop gain to the torque error and pulses with modulated (PWM) output commands (motor voltage commands) are applied to a power amplifier 174 which supplies the motor drive current for robot joint operation. Current feedback from resistor 175 is generated every 250 microseconds (see referenced patent application Ser. No. 932,975 and converted to digital signals by box 176 with scaling applied by box 178.

OVERVIEW—ELECTRONIC BOARDS

Figure 4:
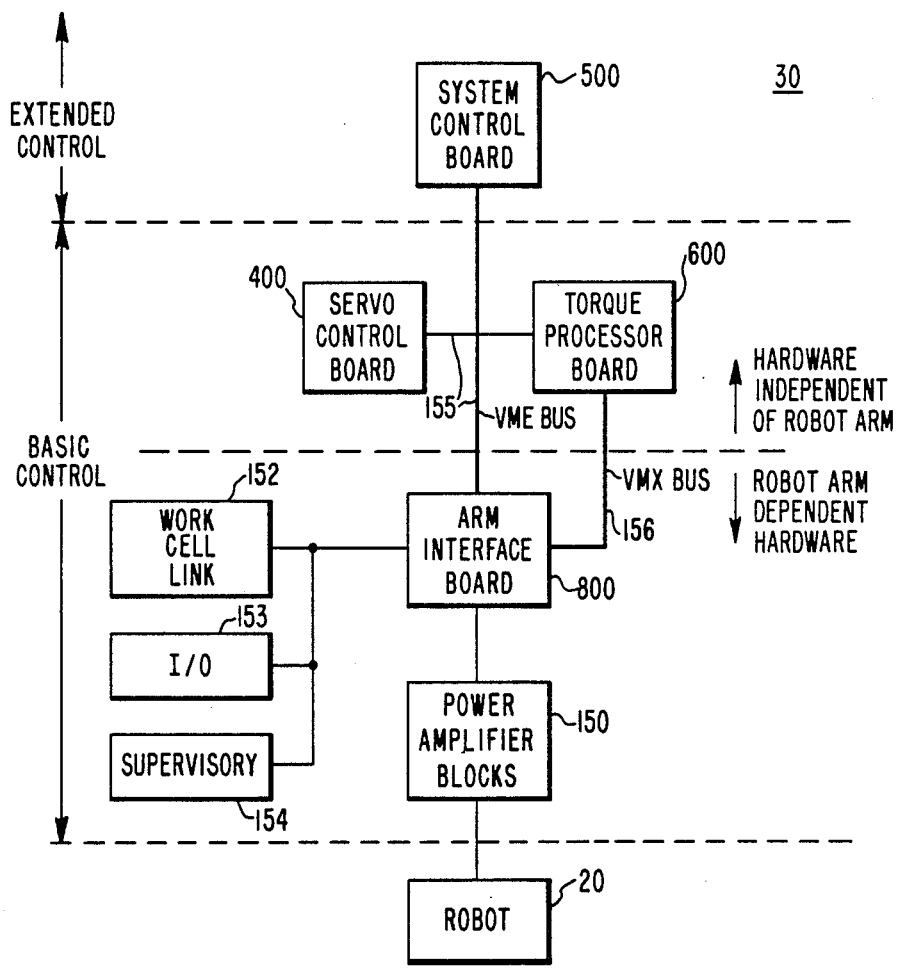
FIG. 4 shows an overview of an arrangement of electronic boards on which circuitry is arranged to implement the robot control system including the microprocessor communication interface of the present invention.

Implementation of the control looping for the robot control 30 in FIG. 4 is achieved by the use of digital control circuitry disposed on a plurality of electronic boards. The organization of the circuitry on the boards and the partitioning of programming among various microprocessors enables advanced robot control performance to be achieved with a modular control configuration characterized with economy of manufacture, facilitates variability of configuration which enables universality of use, and flexibility in choice of level of control performance.

As shown in FIG. 4, the control board configuration includes an arm interface board 800 which preferably houses all circuitry dependent on the type of robot arm being controlled. For example, position feedback circuitry will differ according to whether absolute or incremental position feedback is used by the robot arm to be controlled. Thus, two or possibly more varieties of the arm interface board 800 can be employed to provide digital control systems for any of a variety of different sizes or types of robot arms. Any particular robot arm would require use of the arm interface board which is structured to work with that robot arm.

The arm interface (AIF) board 800 also houses generic circuitry such as VME bus control circuitry which is generally related to two or more boards and not to any one board in particular.

Control signals (pulse width modulated) are generated from the AIF board 800 to control power amplifier blocks 150 which supply motor currents to the robot joint motors. The AIF board 800 also operates as a channel for external coupling of the robot control 30 to other robot controls in a work cell as indicated by the reference character 152, to programmable controllers and other input/output devices 153 in an area network and to higher level computers 154 for supervisory control.

A torque processor (TP) board 600 and a servo control board 400 are generic circuit boards used with the AIF board 800 and power amplifier blocks 150 in all robot control systems for all robot types. The three circuit boards 400, 600 and 800 provide complete 6 axis control for a robot arm and thus form a basic control configuration for the UNIVAL family of robot controls as well as other robot controls.

The torque processor board 600 provides motor torque control in response to commands from the servo control board 400. In turn, the servo control board 400 provides arm solutions and position and velocity control in accordance with a robot control program.

Extended control capability and/or system functioning is achieved by interconnecting additional electronic boards or devices to the basic control 400, 600, 800. For example, with the addition of a system control board 500 and partitioning of predetermined program functions including the arm solutions from the servo control board 400 to the system control board 500, the UNIVAL control can operate the robot 20 and other robots with significantly faster control action, i.e., with a trajectory cycle shortened from thirty-two milliseconds to eight milliseconds.

Interboard data communications for control and other purposes occur over multiple signal paths in a VME bus 155. Additionally, a VMX bus 156 is provided for connection between the torque processor board 600 and the AIF board 800.

Multiple pin interconnectors (not shown in FIG. 4) are provided on the AIF, TP and SCM boards and any other connectable units to facilitate VME and VMX interboard bus connections modular and board assembly for the robot control 30. Other connectors are provided on the AIF board 800 for external input/output connections.

More detail on the board circuit structure is presented herein or elsewhere in the writeups for the cross-referenced patent applications.

OVERVIEW OF IMPROVED SERVO CONTROL HAVING BANK-SWITCHED MICROPROCESSORS

Figure 5:
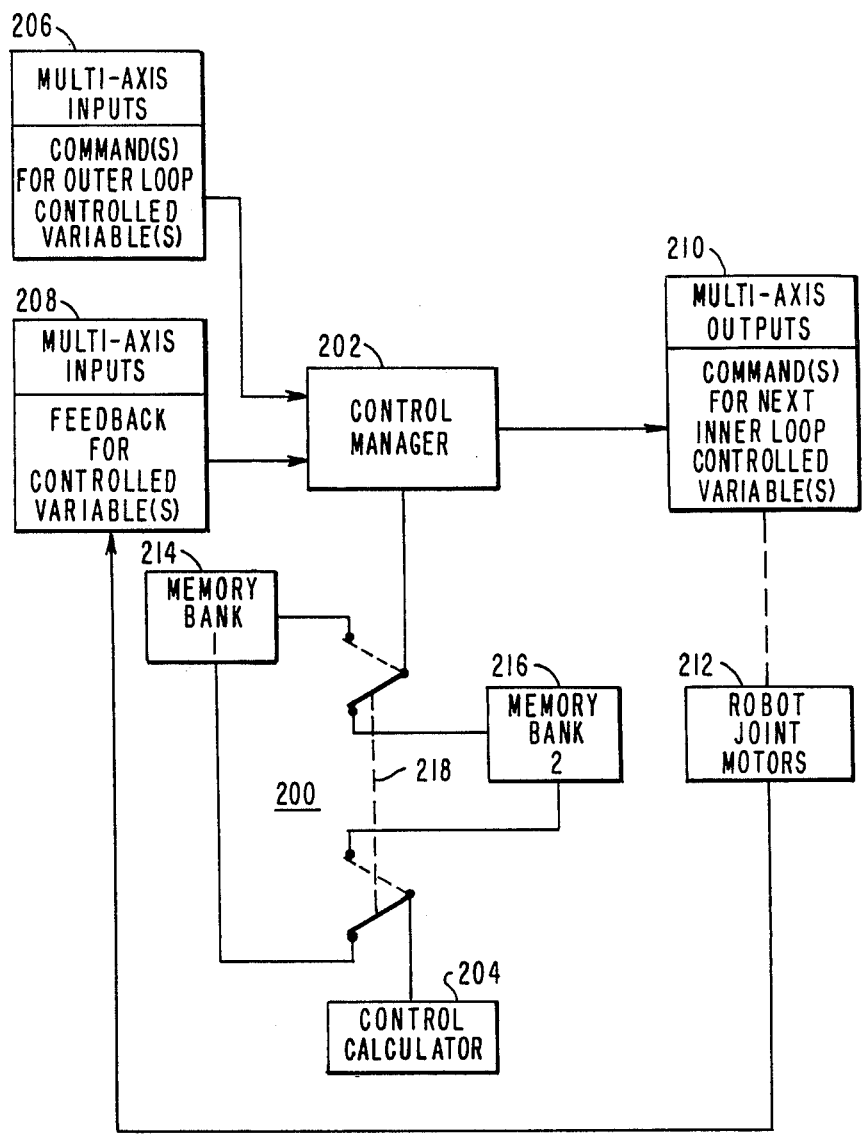
FIG. 5 shows a block diagram of a generalized servo control in which multiple microprocessors are interfaced in accordance with the invention.
Figures 1, 6A:
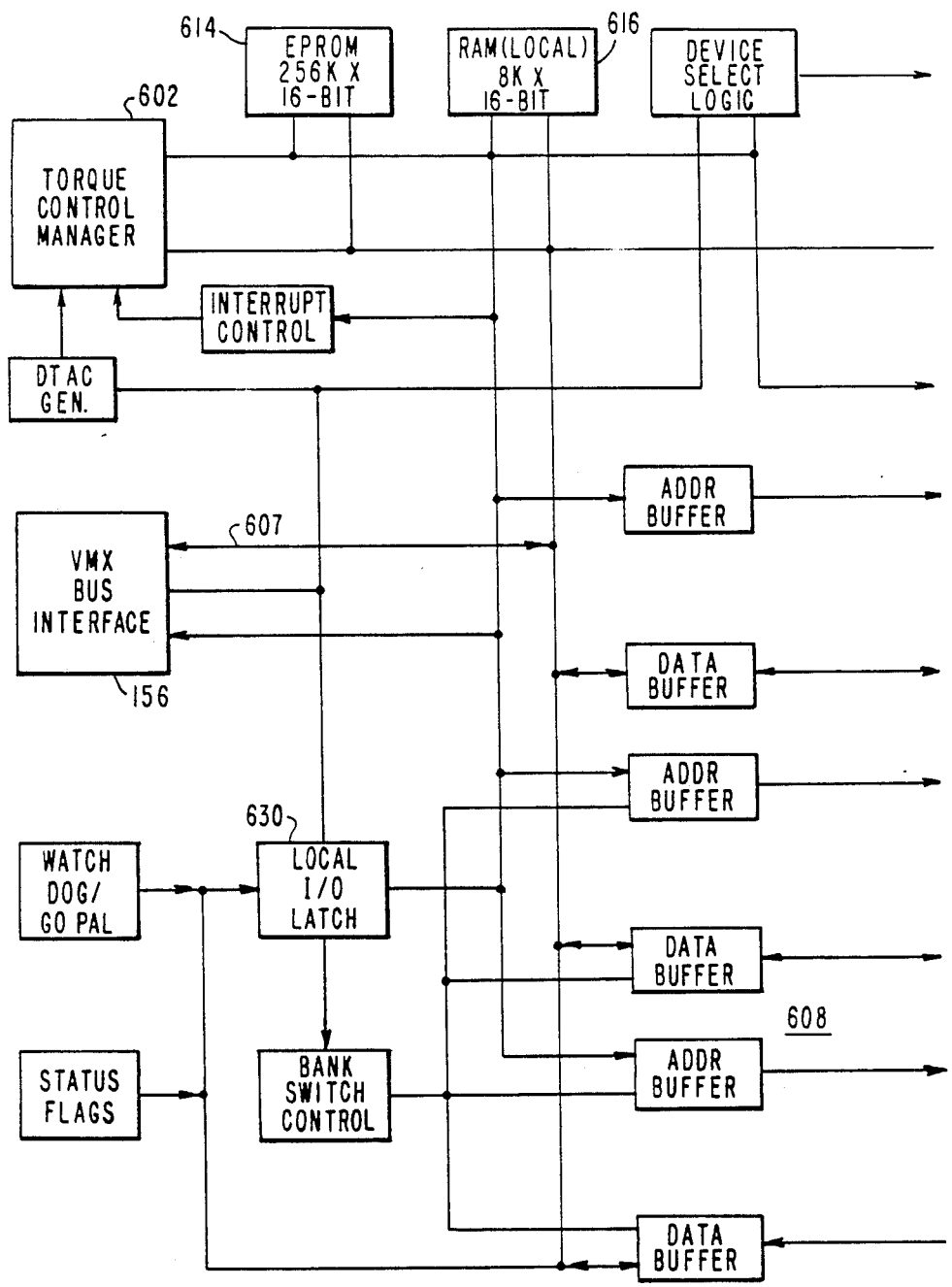
Figures 2, 6A:
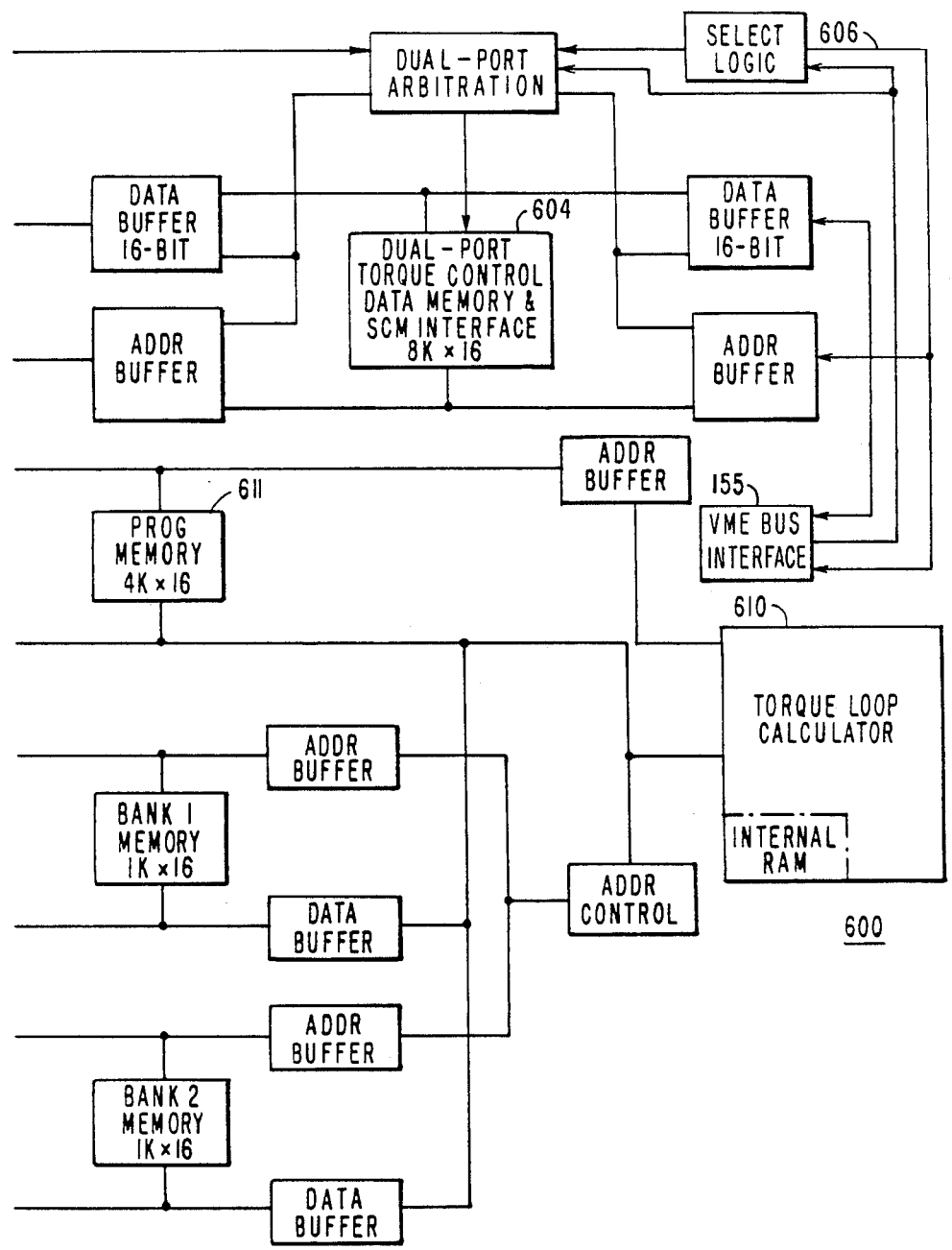

In FIG. 5, there is shown a general representation of a robot control system in which a servo control 200 operates robot joint motor drives in accordance with the invention. The servo control 200 functions in one or more control loops; for example, it may provide the control processing needed for the robot position and velocity control loops in cascade (FIG. 2) or in parallel (FIG. 3) or it may provide the control processing needed for the robot torque control loop (FIG. 3).

The servo control 200 is structured about a microprocessor 202 called a control manager and another microprocessor 204 called a control calculator. The combination of the control manager 202 and the control calculator 204 functions efficiently to perform servo control tasks and control support tasks for multiple robot axes as more fully disclosed in referenced patent application U.S. Pat. No. 4,763,055.

Generally, the control manager 202 has high data processing capability and performs control support tasks, while the control calculator 204 has high calculating capability and performs control calculation tasks. Commands for the controlled variable for the multiple axes are received by the control manager 202 from the next higher control level as indicated by block 206. Feedback for the controlled variable for the multiple axes is also received by the control manager 202 from the robot as indicated by the block 208. Calculated control commands generated by the control calculator 204 are applied as outputs to the next lower level control loop as shown by block 210 or interfaced as outputs to drive the robot joint motors 212.

Input/output control data needed for control calculations is transferred by the control manager 202 through a bank switched or ping-pong memory having a first memory bank 214 and a second memory bank 216. As indicated schematically by a double pole double throw switch 218, each microprocessor 202 or 204 is connected to one of the memory banks and the connections are simultaneously cross-switched when the symbolic switch 218 is operated. In this way, each microprocessor can communicate with the other microprocessor essentially without impacting control processing performance.

An inter-microprocessor communications interface is thus provided by memory bank switching. During a first bank switch state, the control manager 202 loads command and feedback data into the bank it then "owns", and the control calculator 204 takes previously loaded control and feedback data from the other bank which it then "owns". The control calculator 204 next runs calculations for all robot axes using stored control algorithm(s) and the current control data and then deposits the calculated results in its memory bank. Memory bank switching then occurs from the first state to the next or second state under the control of the control manager 202 so that the new control control data is made available for calculations in the next sample period. Bank switching occurs in the present embodiment at the subloop cyclic sampling every 250 microseconds.

In the digital robot control disclosed in the three times aforementioned referenced patent applications, a servo control embodying the invention disclosed and claimed herein is applied at two levels of the control. At the torque control loop level, the servo control with bank switched memory is employed to make motor voltage command calculations in the torque loop. At higher levels, the servo control makes velocity command and torque command calculations in the position and velocity loops. Accordingly, one servo control with bank switched memory is provided on the SCM board 400 and another servo control with bank switched memory is provided on the TP board 600.

The following description sets forth the general manner in which the servo control with bank switched memory operates on the SCM and TP boards. In addition, more detailed SCM and TP circuitry is described insofar as it is directly related to the servo control with bank switched memory. For more SCM and TP circuit and software detail, reference is made to Ser. No. 932,991 and U.S. Pat. No. 4,763,055.

SERVO CONTROL WITH BANK SWITCHED MEMORY ON THE TP BOARD

The torque processor (TP) board 600 provides a functional interface to the robot joint drive motors. Functionally, the TP board 600 implements the lowest level of control in the hierarchical control system, providing closed loop servo torque control for six robot axes. Physically, the TP board 600 electrically interfaces the robot path planning control system and the servo control (SCM) board with the arm interface (AIF) board 800, which in turn interfaces to the robot joint drive motors. The primary function of the TP board 600 is to regulate robot joint motor currents to commanded values by generating motor winding voltage commands which are executed using a pulse width modulation scheme on the AIF board.

The TP board 600 interfaces at one level to the SCM board, accepts from the SCM board torque commands and servo parameters for six axes and returns status data. The TP board 600 interfaces at a second lower level to the AIF board 800 providing servo voltage commands for the six robot axes. The AIF board 800 receives drive motor current, position and velocity feedback for closed loop control on the SCM and TP boards.

The TP board 600 employs the paired microprocessor to provide a number of features including the following:

1. Torque loop control for six axes (250 micro sec per 6 axes) for brush and brushless motors;
2. Software adjustable current offset—eliminates potentiometers;
3. Downloadable gains—arm dependent parameters can be downloaded from the SCM board;
4. PWM compensation;
5. Commutation compensation;
6. Current averaging for data logging and other purposes;
7. Current limit check;
8. Velocity monitoring (back emf) for safety check;
9. Energy check (IIT) to test stall condition;
10. Power-up self diagnostics; and
11. Downloadable diagnostics system.

More advanced robot performance is produced by digitally controlling the torque applied at the arm workpoint when the arm is in motion to control the arm workpoint position in accordance with a command trajectory. Axis drive forces are adjusted in accordance with actually experienced workpiece loading to satisfy position and trajectory commands with greater speed, accuracy and efficiency. Reference is made to Ser. No. 932,977 for a related invention directed to the control of torque as an end controlled variable.

The torque control is embodied on a generic control circuit board 600 (FIGS. 4 and 6A-1 and 6A-2 called a torque processor (TP) board i.e., an electronic board usable to provide torque control for a wide variety of robots having different load capacities, different types of drives, different numbers of axes, etc.

The torque processor board 600 employs digital circuitry to generate voltage commands for each joint motor or axis drive on the basis of torque commands obtained from a higher control level (SCM board) and feedback currents obtained through the arm interface (AIF) board 800 from the axis drives. Thus, the torque control loops for all of the joint motors are closed through the TP board circuitry.

In the case of electric drives, the feedback current is the motor winding current which is proportional to actual motor torque. For hydraulic drives, the feedback signal is also proportional to actual motor torque.

The digital torque control circuitry is preferably structured with multiple digital processors so that needed control computation and control support functions can be achieved for all axes accurately and efficiently within sampling frequency requirements.

In particular, a torque control manager 602 interfaces with a dual port SCM interface memory 604 for the exchange of stored torque control data between the SCM (servo control module) and the TP (torque processor) control levels. Axis torque commands and control loop parameters are downloaded from the SCM to the TP interface memory 604 through a data bus 606 preferably of the VME type. In return, status data is uploaded to the servo control level (SCM). The interface memory 604 between the TP and SCM boards is a dual port shared memory scheme which serves as a slave to the VME bus 606. Other board memories include a ping-pong memory 608, program EPROM 614, local RAM 616, and TP calculator memory 611 in FIG. 6A-2.

The torque control manager 602 also directs the flow of current feedback from circuitry on the AIF board 800 at the next lower control level to the torque processor board 600 for torque control loop operation. Drive voltage commands resulting from torque control calculations are directed to the arm interface (AIF) board 800 by the torque control manager 602. The ping-pong (bank switched) 608 operates under the control of handshake flags to store command, feedback, and status data so that is is available when needed for torque control calculations or for higher control level reporting requirements or for axis drive control.

A coprocessor 610 provided in the form of a digital signal processor operates as a torque loop calculator which receives torque commands and feedback currents from the torque control manager 602 through the ping-pong memory 608, calculates drive voltage commands for the various robot axes from the torque errors computed from the torque commands and feedback currents, and transfers the drive voltage commands through the ping-pong memory 608 to the arm interface circuitry on command from the torque control manager 602.

With the described digital circuit structure, all needed torque control functions are able to be performed rapidly (250 microsecond sampling rate or better) and accurately within frequency response requirements. Specifically, the rapid calculating capability of the digital signal processor 610 is employed for the torque control calculations as the data organizing and directing capability of the torque control manager 602 is employed for most other functions thereby enabling highly improved control performance to be achieved efficiently and economically.

The torque control manager 602 has an architecture well suited for the tasks described for data management but which has a calculating speed (i.e., over 4 microseconds for a 16×16 bit multiplication) too limited to meet torque control bandwidth requirements. The digital signal processor 610 has an architecture set for Z transform calculations (i.e., a calculating speed of 200 nanoseconds for a 16×16 bit multiplication) but which is otherwise generally unsuitable for the kinds of tasks assigned to the data manager processor 602. These two microprocessors function together as a unit or, in other terms, as a servo engine.

For more detail on the torque board circuitry, reference is made to Ser. No. 932,977 or U.S. Pat. No. 4,763,055.

TORQUE CONTROL PROGRAMMING

The torque processor board 600 is operated under the control of programs executed in the on board processors 602 and 610 to implement torque command signals from the higher SCM control level.

The torque processor software generally performs the following tasks which are partitioned as indicated:

Torque Control Manager 602

Communication with SCM
Command handling
Current sampling, conversion and offset adjustment
Commutation switch flag (state reading)
Ping-pong memory management
PWM chip management
Diagnostics
Error reporting

Torque Loop Calculator 610

(program cycling based on 250 microsecond interrupt)

Overcurrent check—absolute and average
Torque loop calculations
Current averaging
PWM compensation
Commutation compensation
Back emf check—monitors velocity for safety
Energy check—tests for stall conditions Reference is made to U.S. Pat. No. 4,786,847 for more detail on TP software structure and operation.

TMS 320

Figures 1, 7A:
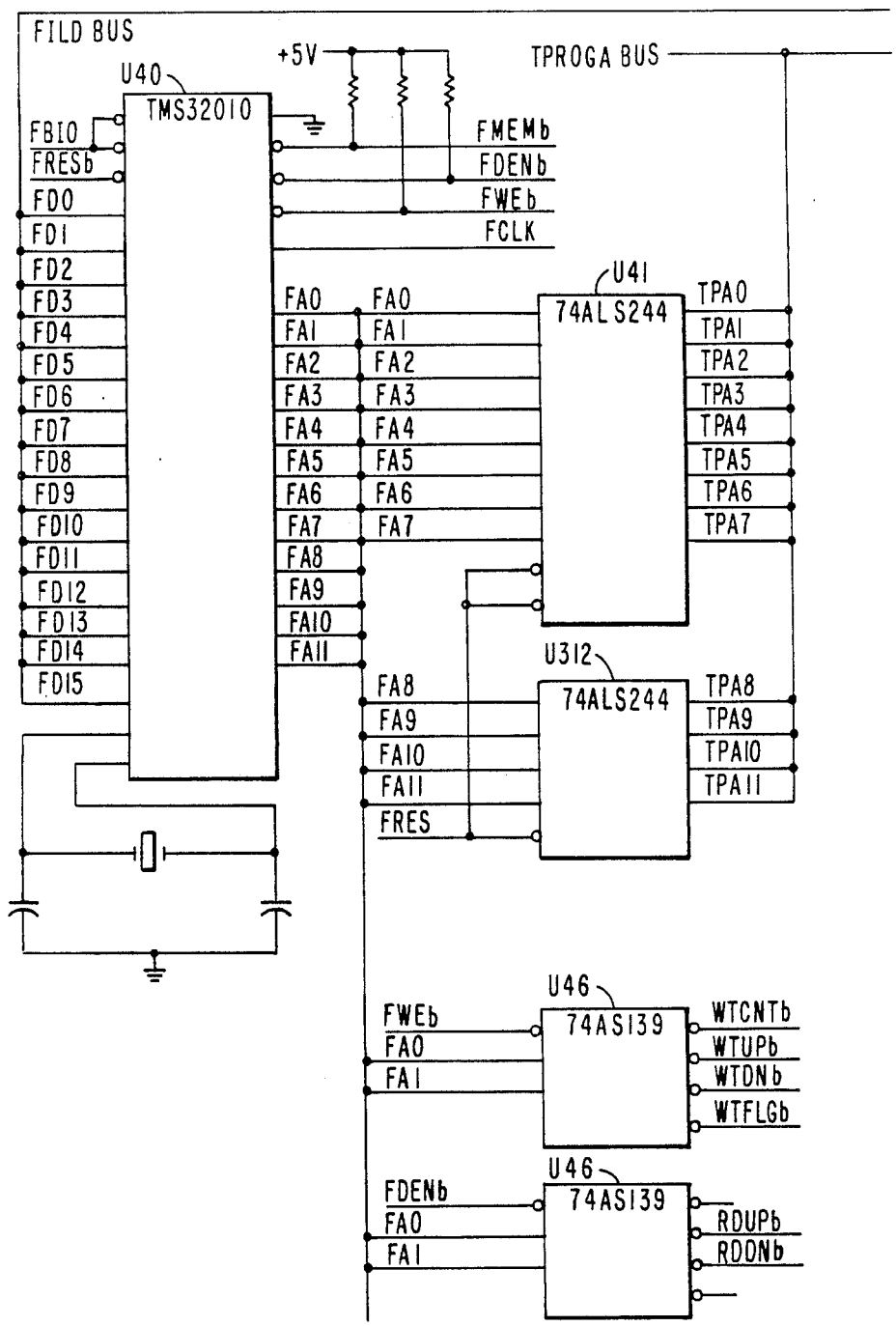
Figures 2, 7A:
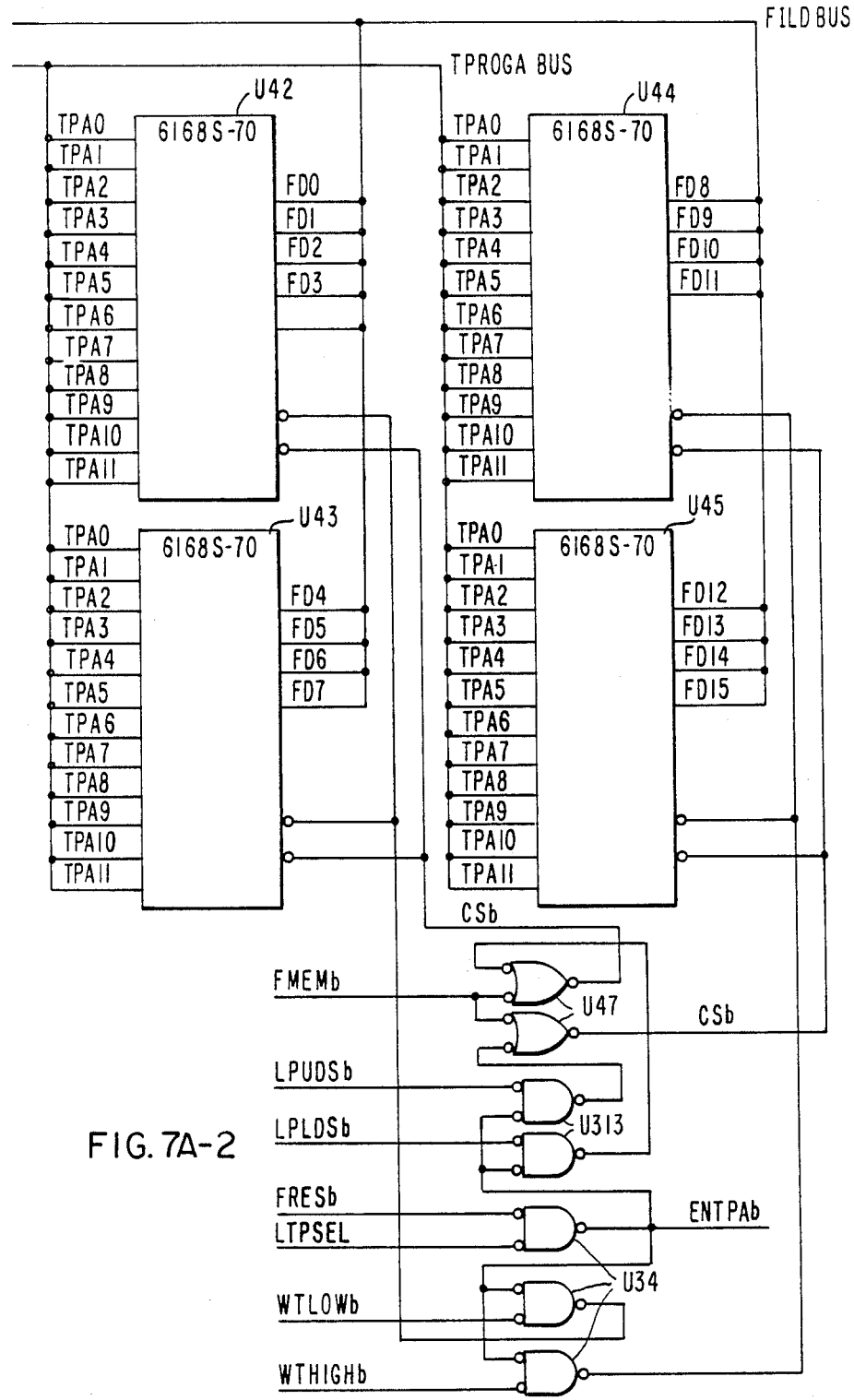

The external interface capability of the TMS 320 reflects the fact that the device was primarily intended to be used in stand alone applications. The TMS 320 is very efficient at performing computational operations; however operation cannot be suspended to allow access to its peripheral circuitry by other devices. As such, usage of the device in a coprocessor application 600 as in FIG. 6A-2 requires specialized interface circuitry. This interface circuitry provides the capability for the 68000 to load the program memory of the TMS 320, and proves a facility for interchange of information between the TMS 320 and the 68000. Access to the TMS 320 program memory by the 68000 requires the TMS 320 to be in the reset condition, that is the TMS 320 reset input must be asserted. The state of the TMS 320 reset signal, FRESb in FIG. 7A-1 is directly controllable as a latched output from the 68000.

The primary interface for interchange of information between the TMS 320 and the 68000 is provided by implementation of a concept referred to as bank switched memory. The bank switched memory consists of two identical, physically separate, 1K by 16-bit RAM arrays. These arrays are referred to as banks. Both banks are resident within the same address space. At any given point in time, ownership of one of the memory banks is associated with the 68000 and ownership of the other bank is associated with the TMS 320. Since the memory appears as a single 1K by 16-bit RAM, access to the memory by either processor is totally transparent to operations by the other processor. This provides for simultaneous access to the interface memory by both processors. Control and handshake signals are associated with switching of the bank ownership.

There are four states associated with the 68000 to TMS 320 interface. These states are referred to as idle, go, processing and done. Assertion of the TMS 320 reset signal forces the interface to be in the idle state. The interface will remain in the idle state until the go state is requested by the 68000. It is to be noted that bank switching can only be effected while the interface is in the idle state. A request for bank switching, at any other time will not be performed until the idle state is reached.

In operation, the 68000 will write information consisting of commands and data in the bank memory, request a bank switch, and set the go state. Switching of the banks makes this information available to the TMS 320. The TMS 320 detects the go state, sets the processing state, and operates on the data, writing the results back into the bank memory. Concurrently, the 68000 can write the bank memory with the next set of commands and data transparent to the TMS 320 operation. The TMS 320 will set the done state upon completion of the required processing. The 68000 detects the done state, forces the idle state, and switches the banks to obtain access to the results of the TMS 320 calculations.

The bank switched memory appears as I/O locations to the TMS 320. Circuitry external to the TMS 320 is required for efficient usage of this memory by the TMS 320 because of the limited I/O parts provided by the TMS 320. Four TMS 320 I/O ports are associated with the bank switched memory and handshake flags. Access to the memory by the TMS 320 is provided by a binary up/down counter. The counter is operated in post-decrement or post-increment mode. Execution of an output to port 0 will result in the counter being loaded with the data value being output. This will then serve as the bank memory address for the next bank memory operation. Operations on port will result in either reading or writing of the bank memory with a post-increment of the memory address. Operations on port 2 will result in either reading or writing of the bank memory with a post-decrement of the memory address. Thus, the memory address counter need only be preset with an address at the beginning of a series of read or write operations. Successive I/O operations on port 1 or 2 will result in access to successive memory locations.

The TMS 320 BIOb pin and I/O port 3 are associated with the handshake interface with the 68000. The 68000 request with the GO state by outputting a hexadecimal data value to XXX1 to address 7EA07. This forces in FIG. 7A-1 to a TMS 320 BIOb signal pin the logical "1". The TMS 320 acknowledges by setting the PROCESSING state. The PROCESSING state is set by the TMS outputting a data value of XXX1 to I/O port 3. After completion of the required processing the TMS 320 sets the DONE sate by outputting a XXX2 to I/O port 3. The 68000 then forces the IDLE state by outputting a XXX0 to address 7EA07. Indication of the IDLE state is reflected by the BIOb signal pin being at a logical "0".

Circuitry associated with the TMS 320 processor is shown in FIGS. 7A-1 through 7A-2. Circuitry shown in FIGS. 7A-1, A-2 is associated with the TMS 320 and its associated program memory. Circuitry shown in FIGS. 7B-1, B-2 and 7C-1, C-2 is associated with the bank switched memory. Circuitry shown in FIGS. 7A-1, A-2 is primarily associated with bank memory addressing and bank switch control.

The TMS 320 program memory, 4K by 16-bits, is implemented with static high speed, access time of 70 nanoseconds or less, RAM provided by devices U42 through U45 in FIG. 7A-1. Contents of this memory must be downloaded by the 68000 before the TMS can be allowed to begin program execution. Access to the TMS 320 program memory by the 68000 is only allowed when the TMS 320 is being held reset. The 68000 can force the TMS 320 to be reset by writing a 0 to location 7EAO1 will release the reset to the TMS 320.

Assertion of the FRESb signal to the TMS 320 will force the TMS 320 to be reset. During reset, the TMS 320 will force its data and control lines to the tri-state condition. However, the address lines are not tri-stated. Therefore, address buffers, devices U41 and U312 are required to permit access to the program memory by the 68000. The TMS 320 provides three signals for external indication of the operation being performed. These signals are FMEMb, which is asserted for indication of a program memory read operation; FDENb, which is asserted for indication of an I/O read operation; and FWEb, which is asserted for indication of either a program memory of I/O write operation. It is to be noted that circuitry external to the TMS 320 on the torque processor module does not support the table write instruction implementation. As such, the TMS 320 cannot write into its program memory. The memory devices used for implementation of the TMS 320 program memory include two input control signals, write enable, WEb, and chip select, CSb in.FIG. 7A-2. A memory read operation is performed by assertion of the CSb signal with the WEb signal non-asserted. A memory write operation is performed by assertion of both control signals. It is to be noted these devices do not provide an output enable signal. Therefore, assertion of CSb and WEb during memory write operations must be essentially coincident in order to prevent data bus contention between the memory devices and the data bus drivers.

The circuitry shown in FIG. 7A-2 consisting of U47, U313, and U34 provides control signal interface to the TMS 320 program memory. This circuitry multiplexes the memory control signals between either the 68000 or the TMS 320, depending on the state of the TMS 320 reset signal, FRESb. Byte operations from the 68000 are supported. The signal ENTPAb is asserted provided the 68000 is attempting to access the TMS 320 program memory and the TMS 320 is reset. This signal being asserted allows the 68000 write high, WTHIGHb, and write low, WTLOWb, signals shown in FIG. 7A-2 to be gated to the write enable inputs of the respective bytes of TMS 320 program memory. Assertion of ENTPAb also allows the 68000 data strobe signals, LPUDSb and LPLDSb to be gated to the chip enable inputs of the respective bytes of TMS 320 program memory.

The TMS 320 provides for implementation of 8 I/O ports. The torque processor module implementation utilizes 4 of these I/O ports for operations related to the bank memory. No attempt is made to fully decode the I/O port addresses. As such, the 4 unused ports overlap the 4 used ports. That is, for example, TMS 320 operations on port 0 or port 4 will result in the same function being performed. Device U46, shown in FIG. 7A-1 is used to provide decoding of the TMS 320 port address for I/O operations. This device decodes the TMS 320 least significant two address signal lines to provide the decoded bank memory related control signals.

Figures 1, 7B:
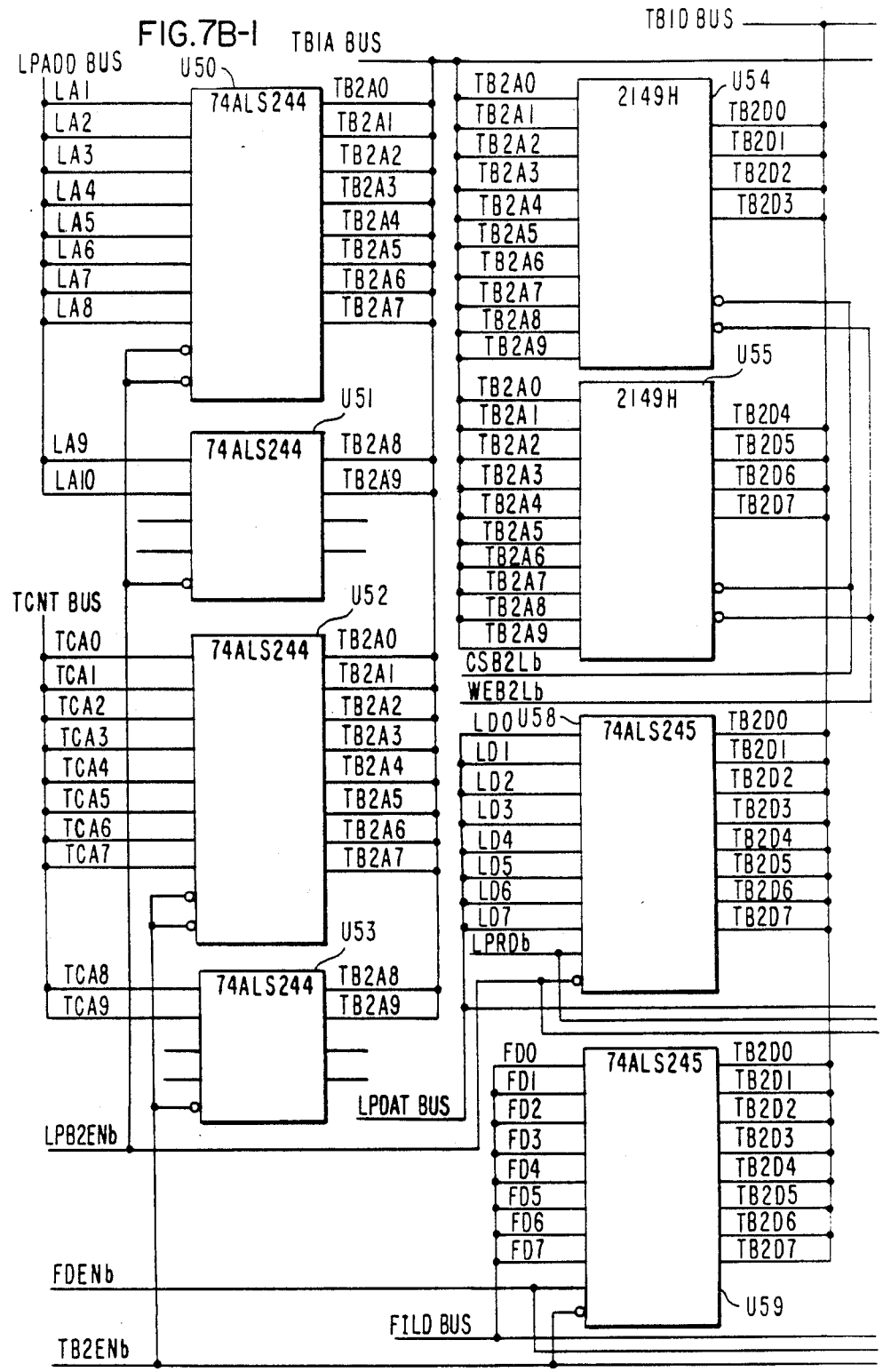
Figures 2, 7B:
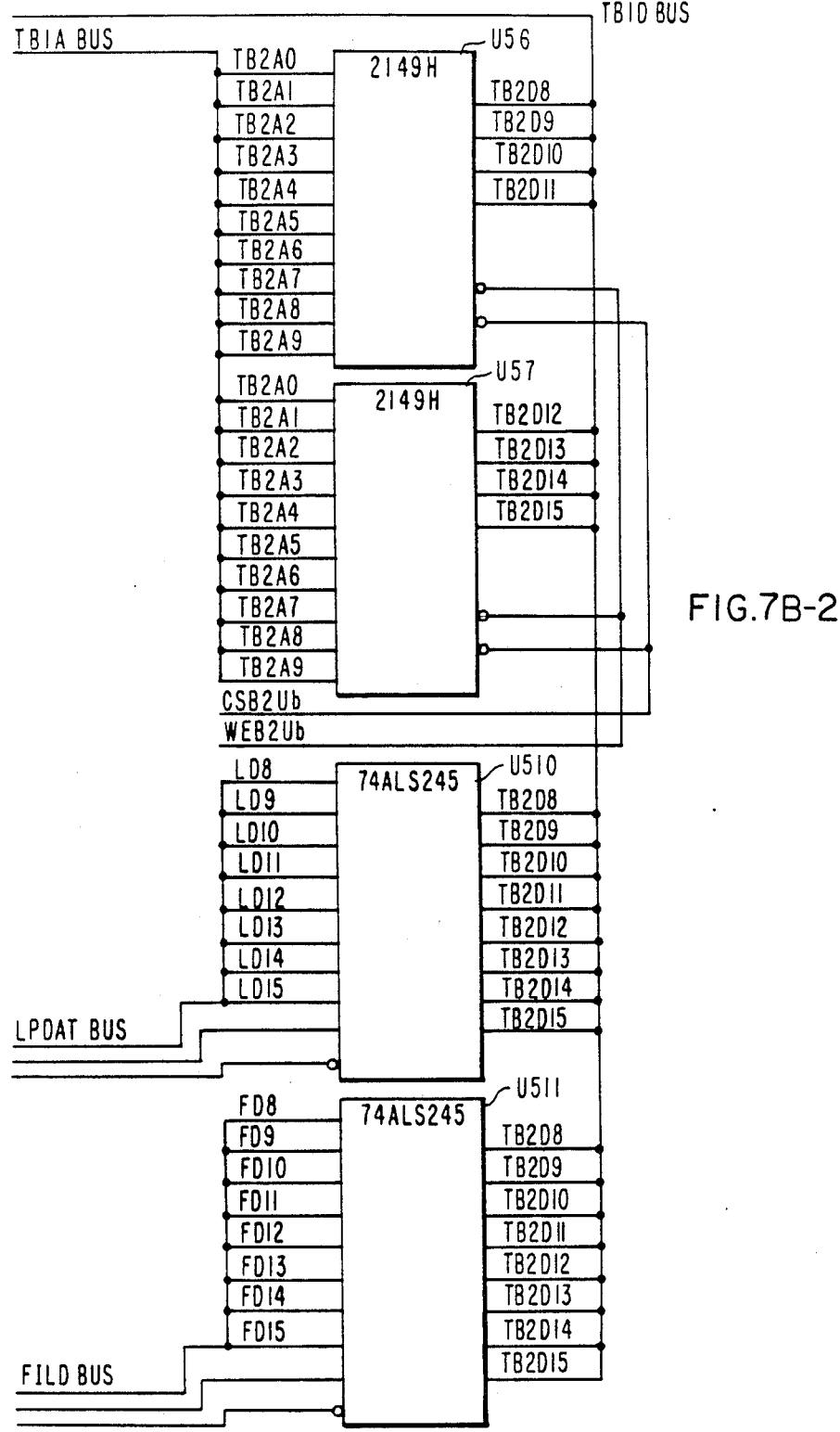
Figures 1, 7C:
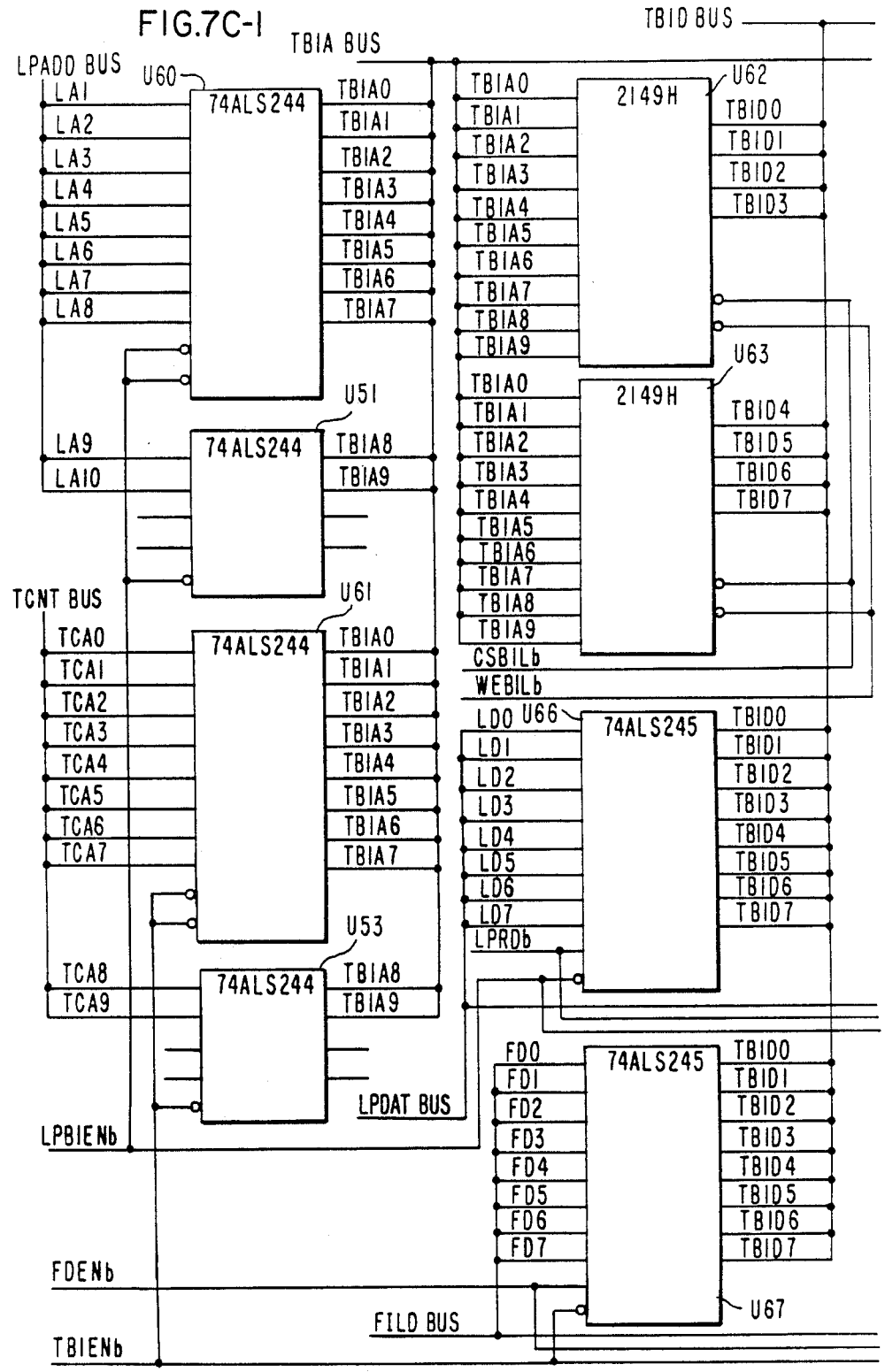
Figures 2, 7C:
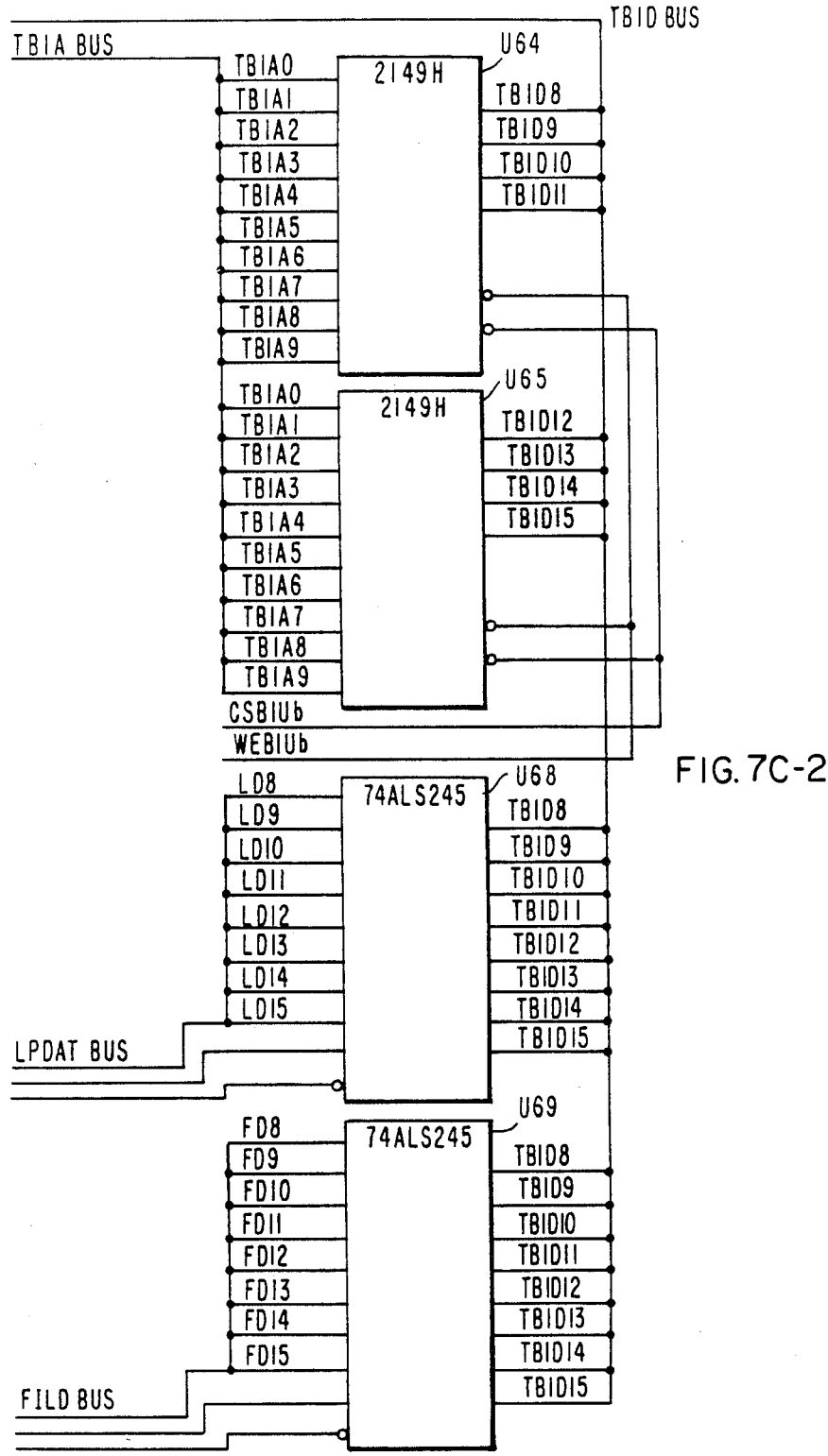
Figures 1, 7D:
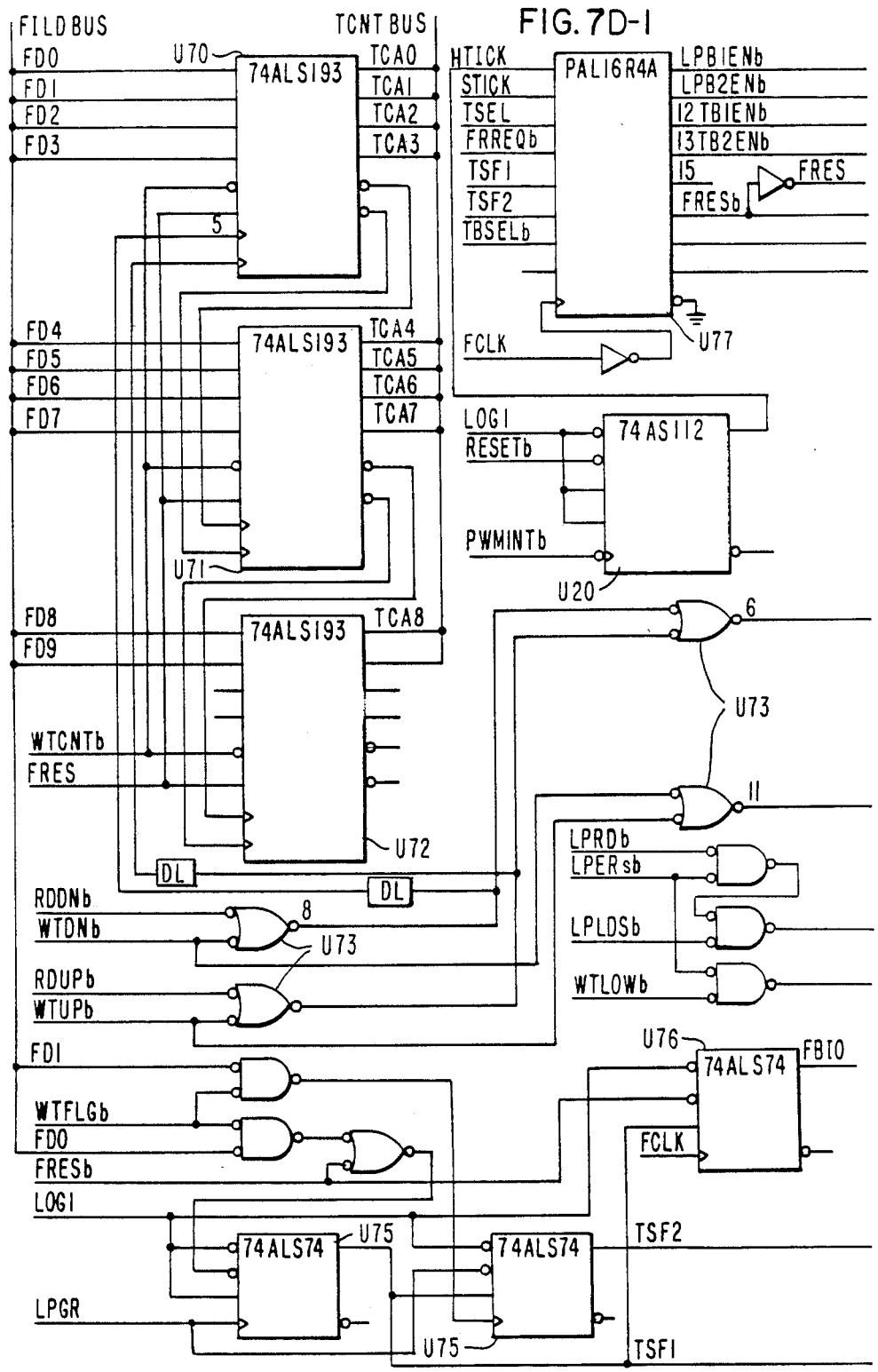
Figures 2, 7D:
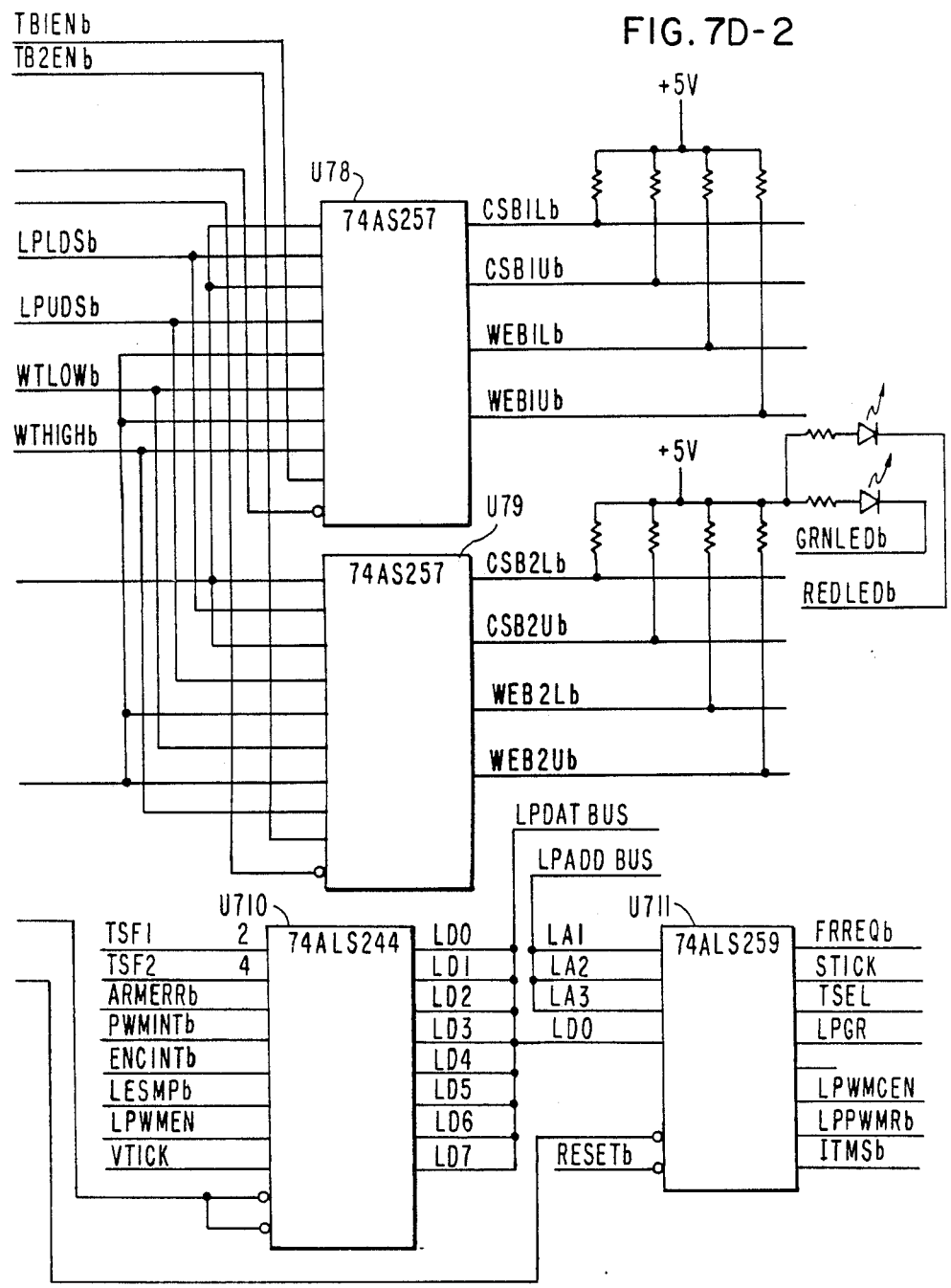

The bank memory is shown in FIGS. 7B-1, 7B-2 and control signal and bank switch logic is shown in FIGS. 7D-1, 7D-2. Devices U50, U51, U52 and U53 in FIG. 7B-1 provide for bank memory address signal line multiplexing. Devices U50 and U51 are associated with the 68000, and devices U52 and U53 are associated with the TMS 320. Inputs to the 68000 address multiplexer consist of the 68000 address signal lines LA1 through LA10, and inputs to the TMS 320 multiplexer consist of the outputs of the bank memory address counter shown in FIG. 7C-1. Devices U58, U510, U59, and U511 provide for bank memory data signal line multiplexing. Devices U58 and U510 in FIGS. 7B-1 and 7B-2 are associated with the 68000, and devices U59 and U511 are associated with the TMS 320. Word and byte operations for 68000 related access to the bank memory are supported. Generation of multiplexer enable control signals is provided by the bank switch control PAL, U77. The TMS 320 related multiplexer enable signal, TB1ENb, is asserted whenever the TMS 320 has ownership of the bank. The 68000 related multiplexer enable signal, LPB1ENb is only asserted when the 68000 has ownership of the bank and access to this memory by the 68000 is being attempted.

Bank memory bank switch control logic comprises the bank switch control PAL, device U77, and the bank memory control signal multiplexers in FIG. 7D-2 devices U78 and U79. The bank switch logic supports two possible sources for determining bank switching. These two sources are referred to as hard tick and soft tick. The hard tick signal is derived from hardware on a fixed time basis. In the case of the torque processor module, this signal is derived by dividing the PWM ramp frequency by two. The soft tick, STICK, is derived from software. The signal TSEL in FIG. 7D-1 is used to select between the hard and soft tick for determination of bank selection. TSEL is output controllable by the 68000. This signal being in the logical "0" state selects the STICK signal for bank switch selction. STICK being in the logical "0" state selects bank 1, circuitry shown on page 5 of the schematics, for ownership by the 68000. The state of TSEL is determined by the state of data bit 0 when a write operation is performed to address location 7EA05, and the state of STICK is determined by the state of data bit 0 when a write operation is performed to location 7EA03. The presently intended applications of the torque processor module use the STICK signal for bank memory selection. The other inputs to the bank switch control PAL consist of the 68000 bank memory select signal, TBSELb, and the interface handshake flags, TSF1 and TSF2 in FIG. 7D-1. TSF1 and TSF2 are used by the bank switch control to effect bank switching only when the interface is in the IDEL state.

The outputs of device U77 consist of 68000 data and address signal line multiplexer enable signals, LPB1ENb and LPB2ENb; TMS 320 data and address signal multiplexer enable signals, TB1ENb and TB2ENb; and the bank memory control signal multiplexer enable signal lines, derived from pins 12 and 13 of U77. The output provided on pin 15 of U77 is used internal to the device for state storage associated with the bank switch operation. The signals TB1ENb and TB2ENb are also used to select the source for the bank memory control signals. Switching of the control lines for the bank memory during the bank switch operation requires a special sequence in order to ensure that the outputs of U78 and U79 remain in the non-asserted state during the switching operation. This sequence requires that both signal lines TB1ENb and TB2ENb be asserted, so that the TMS 320 related control signals are multiplexed to the bank memory control signals. Then the bank memory control signal multiplexer enable signals, pins 12 and 13 of U77, are non-asserted, forcing the outputs of U78 and U79 to the tri-state condition. Then either TB1ENb or TB2ENb, according to corresponding new ownership of the bank memory by the 68000 as determined by the state of the selected tick signal, is non-asserted. This is then followed by assertion of the appropriate control signal multiplexer signal. The TMS 320 data and address multiplexer enable signal and memory control signal remain then asserted until the next bank switch operation. The 68000 related data, address and memory control multiplexer enable signals only become asserted when the 68000 is requisition access to the bank memory.

Device in FIG. 7D-1 is used to generate the TMS 320 bank memory control signals. Pin 6 of U73 will be asserted whenever a TMS 320 bank memory read or write operation is performed. Pin 11 of U73 will be asserted whenever a TMS 320 bank memory write operation is performed. These signal lines are then multiplexed to the appropriate bank memory chip select and write enable signals by U78 or U79.

The bank memory address counter consists of devices U70 through U72. Assertion of the FRESb signal resets the counter. TMS 320 output on port 0 or 4 forces WTCNTb to be asserted which forces the counter to be parallel loaded with the data value being output. Input or output on ports 1 or 5 will result in reading or writing of data to or from the appropriate bank memory. This will force pin 8 of U73 to be asserted. Completion of the read operation wil then force U73 pin 8 to be non-asserted, which will result in the address counter being incremented by one. The delay line inserted between U73 pin 8 and U70 pin 5 is required to ensure address hold time requirements for the bank memory are satisfied. In a corresponding sense, input or output on ports 2 or 6 will result similar operation with the address counter being decremented.

Device U75 provides for state storage of the interface handshake flags. In the idle state both halves of U75 are reset. The 68000 requests the go state by writing a 1 to address 7EA07. This forces the signal LPGR to transition to the logical "1" state, which clocks TSF1 to a logical "1". LPGR being in the logical "1" state also forces the reset signal to TSF2 to be non-asserted. Device U76 provides for synchronization of the FBIO signal with the TMS 320 clock FCLK. The TMS 320 sets the processing state by outputting a data value of XXX1 to port 3 or 7. This results in setting TSF2 to a logical "1". The TMS 320 sets the done state by outputting a data value of XXX2 to port 3 or 7. This forces TSF2 to the logical "0" state. The 68000 forces the idle state by writing a 0 to address 7EA07, which forces LPGR to the logical "0" state, resetting TSF1.

Signals TSF1 and TSF2 are also connected to pins 2 and 4 respectively of U710 in FIG. 7D-2. This provides the capability for the state of the interface handshake signals to be monitored by the 68000. A 68000 read from location 7EA01 will result in the data bits 0 and 1 reflecting the state of TSF1 and TSF2 respectively. Device U710 also provides the capability for monitoring other status related signals as follows:

| Signal | Data Bit | Function |
|--------|----------|----------|
| ARMERRb | 2 | Arm interface module error |
| PWMINTb | 3 | PWM sample interrupt state |
| ENCINTb | 4 | Encoder index interrupt state |
| LESMPb | 5 | Encoder sample interrupt state |
| LPWMEN | 6 | PWM enable signal state |
| VTICK | 7 | VME bus tick signal state |

Device U711 provides for storage of the TMS 320 control signals. U711 is an eight-bit addressable latch, which provides for implementation of an eight location, signel bit wide memory element. Assertion of RESETb forces all locations to the logical "0" state. Three additional outputs not previously described are provided by U711. These signals are PWM clock enable, LPWMCEN; PMW reset, LPPWMRb; and a signal which provides the capability for the 68000 to interrupt the TMS 320, ITMSb. An address map for these devices is as follows:

| Address | Signal |
|---------|--------|
| 7EA01 | FRREQb |
| 7EA03 | STICK |
| 7EA05 | TSEL |
| 7EA07 | LPGR |
| 7EA09 | not used |
| 7EA0B | LPWMCEN |
| 7EA0D | LPPWMRb |
| 7EA0F | ITMSb |

SERVO CONTROL WITH BANK SWITCHED MEMORY ON THE SCM BOARD

A servo control module (SCM) or board 400 (FIGS. 8A-1, A-2) is structured in accordance with the modular architecture of the robot control system to operate as a core board for a complete basic robot control. It arm solutions from stored robot program commands or operates as part of an expanded robot control and receives for implementation arm solutions produced from robot program commands by the higher level system control board. The generation of arm solutions involves the execution of robot control functions including robot program language interpretation, path planning, trajectory calculations (intermediate position commands and axis cooridnation) and transformation of position information between Cartesian and robot joint and robot tool coordinate systems. The SCM board 400 additionally provides communications interfacing with related peripherals and a host controller if provided.

The SCM board 400 is provided with program controlled digital circuitry to implement arm motion control loops for the robot control system. Motion control is achieved for each axis through a control loop arrangement which preferably includes interrelated position, velocity, and acceleration control loops from which torque commands are developed for implementation by the torque processor module 600. The digital servo control is a coordinated multiprocessor servo control that generates output torque commands from (1) position and velocity commands provided for each axis by the arm solution and (2) position and velocity feedback signals obtained from the position encoders and the tachometers through the arm interface module 800.

In the SCM control loop operation, a position error is calculated for each axis from the applied axis position command and the axis position feedback. A velocity error is calculated for each axis from a velocity command derived from successive position commands and from the axis velocity feedback. Preferably, the position and velocity control loops are operated in parallel, i.e., the position and velocity errors are summed to produce a torque command for the torque control loop on the torque control module 600. Additionally, an acceleration command preferably is derived from successive velocity commands and applied in a feedforward acceleration control loop which generates an acceleration based torque command for summation with the position and velocity errors in generating the SCM output torque command.

The frequency with which loop calculations are made is selected to produce robot arm motion which is fast, accurate, smooth and stable. For example, the frequency employed can be such as to provide a trajectory cycle of 32 milliseconds as in the present case. If desired, a faster trajectory cycle, i.e., as short as 8 milliseconds, can be achieved.

SCM DIGITAL CIRCUITRY

Figures 1, 8A:
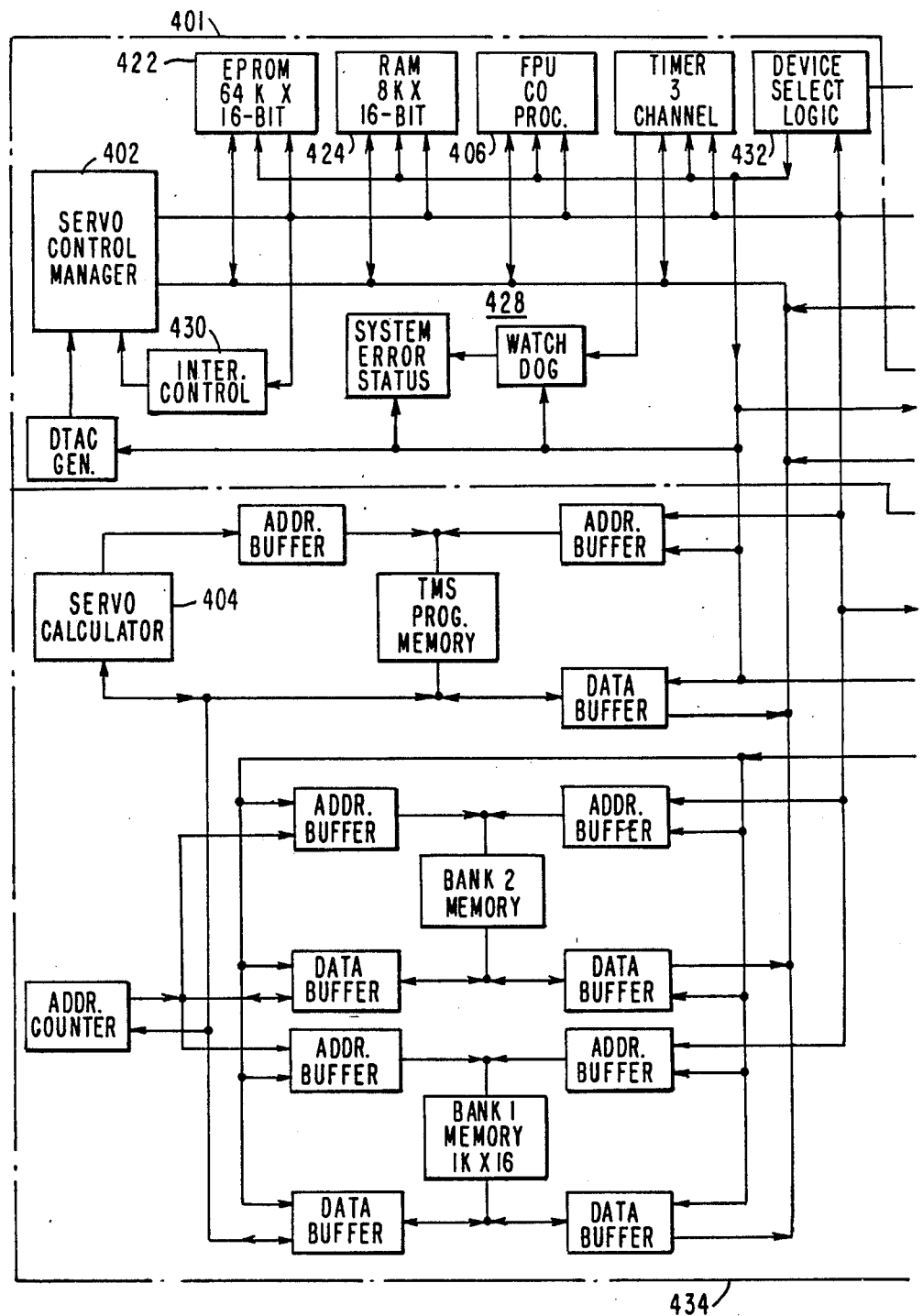
Figures 2, 8A:
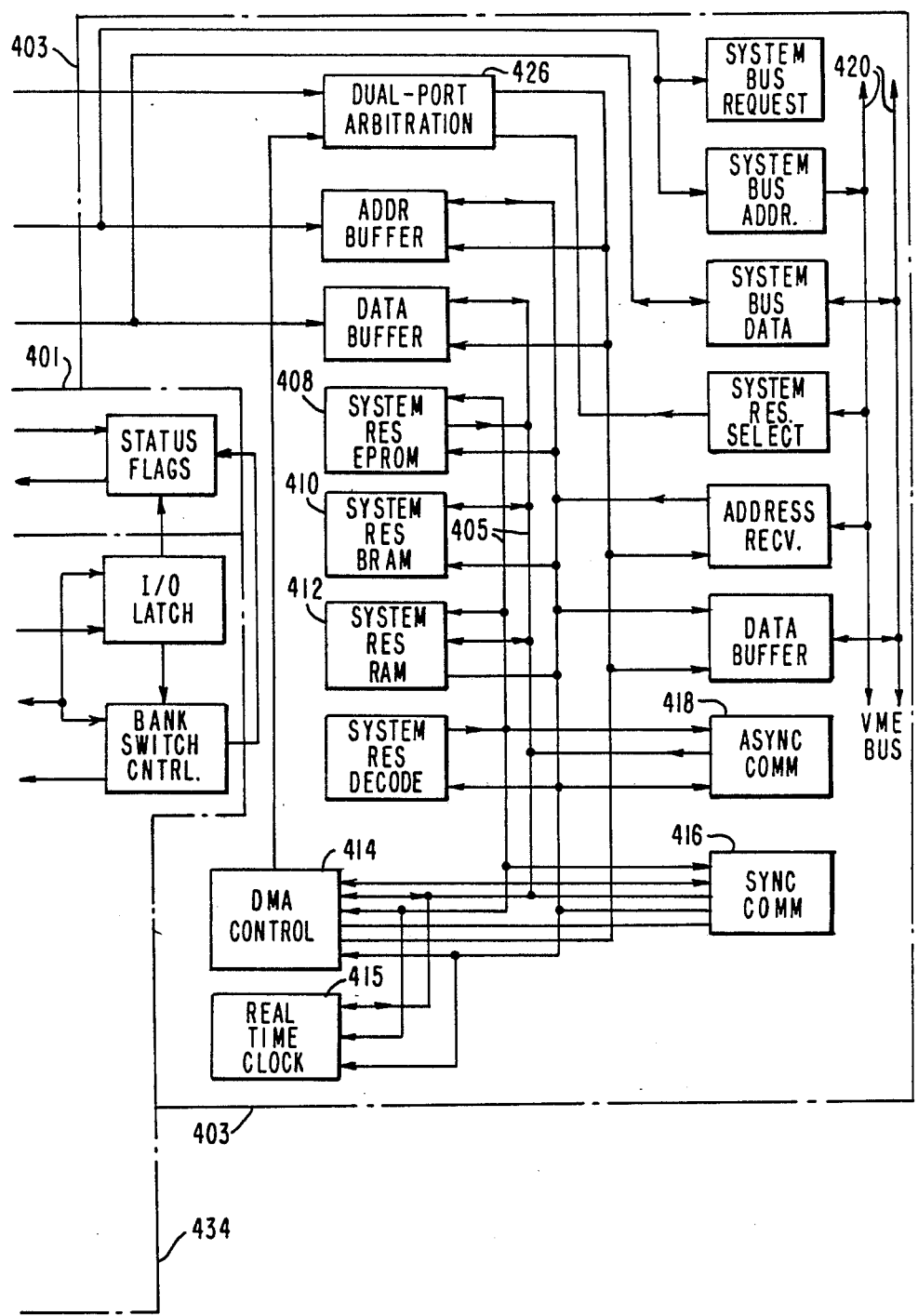

As observed in FIGS. 8A-1 and 8A-2 the SCM board 400 of FIG. 4 generally comprises two sections, i.e., a local processor section 401 and a system resource section 403. The system resource section 403 employs a bus 405 and provides functions related to the overall robot control system and not specifically related to execution of the position and velocity control loops.

These functions include 408 for storage of the robot arm solutions, battery backed-up RAM 410 for storage of non-volatile data, static RAM 412, real-time clock 415, a DMA controller and two multi-protocol, dual channel communications controllers 416 and 418.

The system resource area is implemented as dual-port memory. As such, equal access to the system resource section is provided from either a local processor 401 or from the VME bus 420. The system resource functions appear as a bus slave to the VME bus. This provides the capability for these related functions to be controlled either from the SCM local processor, or from an optional processor connected to the system bus.

In the local processor section 401, the SCM digital circuitry includes coordinated digital coprocessors and interface and resource circuitry needed for specified performance, i.e., to provide control calculations and control data management needed for accurate and efficient control of all axes and to provide interfacing communication with a host controller, peripheral devices and other robot controllers. Preferably, a servo control manager 402 operates with a servo calculator 404 which functions as a slave processor principally to make position and velocity control loop calculations (i.e., feedback filters, loop gains, position and velocity errors, etc.).

The servo control manager 402 directs control, status and program data to and from the SCM board 400 and to and from the servo position/velocity control calculator 404. The servo control manager 402 can be a Motorola 68000 which has a high data processing capability. By separating data management and control calculation tasks in accordance with the respective capabilities of the processors 402 and 404, a basic circuit organization is provided as a basis for achieving substantially improved control performance with manufacturing and user economy.

In the illustrated embodiment, implementation of the local processor section of the SCM board 400 is based on usage of a 68000 processor as the servo control manager 402 and two coprocessors. Both coprocessors serve as peripheral devices to the 68000. One of the coprocessors 406 (preferably National Semiconductor 32081), provides floating-point calculation capability when arm solutions are to be provided by the SCM board 400. The other coprocessor, or slave processor, is the position/velocity servo calculator 404 and is implemented with a Texas Instruments TMS-32010 Digital Signal Processor. The position/velocity processor provides high speed fixed point calculation capability.

The remaining functions which are a part of the local processor section include local memory, both EPROM 422 and RAM 424, a peripheral timer/counter device, interrupt control 430, and system error monitoring devices 428. The local processor 402 can serve as a master to the VME bus for access to the TPM or other related type functions. However, the SCM board 400 does not provide VME bus system controller type functions which normally include system reset generation, bus arbitration for access to the bus and sytem bus clock generation, since these functions are implemented on the arm interface board 800.

The SCM board 400 is arranged to provide as much systems flexibility as is reasonably possible, and to obtain the maximum performance from available large scale integrated (LSI) circuitry. This is one of the reasons that the DMA and communications facilities are implemented in the system resource area as opposed to being directly connected to the local processor bus. This architecture not only frees the servo control manager 400 from direct intervention in communications data movement, it also eliminates the local processor bus communications related overhead, thus allowing high speed serial communications to be conducted without significant impact on program execution time in the servo control manager 400. Also, by placing these functions in the system resource area, these facilities can be operated by any other optional processor with capability of serving as a VME bus master. This would then totally free the servo control manager 400 from communications related processing. This organization allows the complete functionality required for a robot control system to be implemented in a cost effective manner and on a minimal set of boards while also allowing increased performance controllers to be implemented without impacting the overall system design.

Another significant area is the interface between the servo control manager 402 and the servo calculator 404. Here, a special dual port memory organization, referred to as "ping-pong" or "bank switched" memory allows either processor to communicate with the other without impacting the processing performance of either processor.

PROGRAMMED OPERATION OF SERVO CONTROL BOARD

The program system (not illustrated) for the servo control data manager 402 in FIG. 8A-1 is incorporated by reference from the foregoing U.S. Pat. No. 4,763,055 which in FIGS. 11B, 11C and 11D comprises a background program called MAIN and a cyclically operated foreground interrupt routine called SERVO. When the system is started as indicated to RESET, an initialization routine called INTINI is executed prior to continuous running of the MAIN program. In addition to the cyclically executed SERVO interrupt, an interrupt routine called C&UNEX operates in the foreground on demand to process unscheduled or unexpected interrupts. Further, a special highest priority routine called the watch dog timer interrupt functions in response to operation of the external watch dog hardware.

Where the robot control system includes the system control board 500 in FIG. 4 for expanded performance through higher computing capacity, the MAIN program provides for receiving and distributing position commands from the system control board 500. In the minimum or basic robot control system configuration, the system control board 500 is not included and the MAIN program further performs arm solutions to generate position commands locally on the servo control board 400. Additional description on the minimum robot control is presented subsequently herein.

The rate at which the MAIN program is interrupted for the cyclical execution of the SERVO routine is controlled by the signal VTICK generated once each millisecond on the VME bus from the arm interface board 800. The basic functions provided by the SERVO routine are:

(1) transfer control data to and from the servo calculator 404;
(2) transfer control data to and from the torque processor board 600;
(3) receive sensor feedback data over the VME bus from the arm interface board 800;
(4) interface to the supporting background task RDMASC;
(5) perform synchronous data logging;
(6) perform one shot data logging;
(7) place broadcast data in a blackboard storage area;
(8) shut the system down if serious error conditions occur.

In the servo calculator, two basic functions are performed. First, downloaded position command data is interpolated for each of the 31 ticks between long ticks in the VALCYCLE, and velocity and acceleration command data are computed from the position command data for each tick. Next, servo calculations are made for each axis after each tick for the position, velocity and acceleration commands then applicable and the concurrently received position and velocity feedback. As a result, a torque command is computed for each axis after every tick for execution by the torque processor board.

The control algorithms executed by the servo calculator are described in greater detail in Ser. No. 932,990.

SERVO CALCULATOR SIGNAL INTERFACE

The TMS 320 processor 404 in FIG. 8A-1 and shown as U40 in FIG. 7A-1 utilizes a modified "Harvard" architecture for speed and flexibility. In a strict Harvard architecture, program and data memory lie in two separate spaces, permitting a full overlap of instruction fetch and execution. The TMS 320 provides very high speed fixed point computational capability as it uses internal hardware to implement functions that other processors typically perform in software or microprogrammed firmware. As an example, the TMS 320 contains a hardware multiplier to perform a 16×16 bit multiplication in 200 nanoseconds. There is also a hardware barrel shifter for shifting data on its way into the ALU. This permits alignment of data and multiplication to be performed in a single instruction.

The input and output signal interface provided by the TMS 320 can be classified in fuctional groups consisting of an address bus, a data bus, transfer control and system control.

The address bus (A0 through A11) is a 12-bit unidirectional bus. It provides the address for bus operation during all TMS 320 cycles. During input/output cycles, address lines A0, A1 and A2 provide information about what port is being addressed for interchange of data, while lines A3 through A11 are all set to the logical "0" state. This provides the capability of addressing 4K words of program memory and eight peripheral or I/O ports. The data bus (D0 through D15) is a 16-bit bidirectional, three-state bus. It provides the general purpose data path for interface with the TMS 320. The data bus only supports transfers of word length, 16 bits wide, fields of data.

The transfer control signal group consists of a program memory read enable signal (MEMb), a data memory read enable signal (DENb), and a write enable signal (WEb). The MEMb signal, asserted low, to enable instruction fetches from the program memory. The DENb signal, asserted low, indicates that the TMS 320 is accepting data over the data bus from the addressed I/O port. The WEb signal, asserted low, indicates that data from the TMS 320 is available on the data bus. Note that this signal line is asserted for all external chip write operations. Distinction between program memory and I/O operations must be made by decoding the state of the address bus. A condition where address lines A3 through A11 are all zero indicates to external devices that the data is to be directed to an I/O device. It is to be noted that the TMS 320 does not provide capability for wait state generation. Accordingly, all external devices interfaced the TMS 320 must respond appropriately within the TMS 320 bus cycles.

Figures 1, 9A:
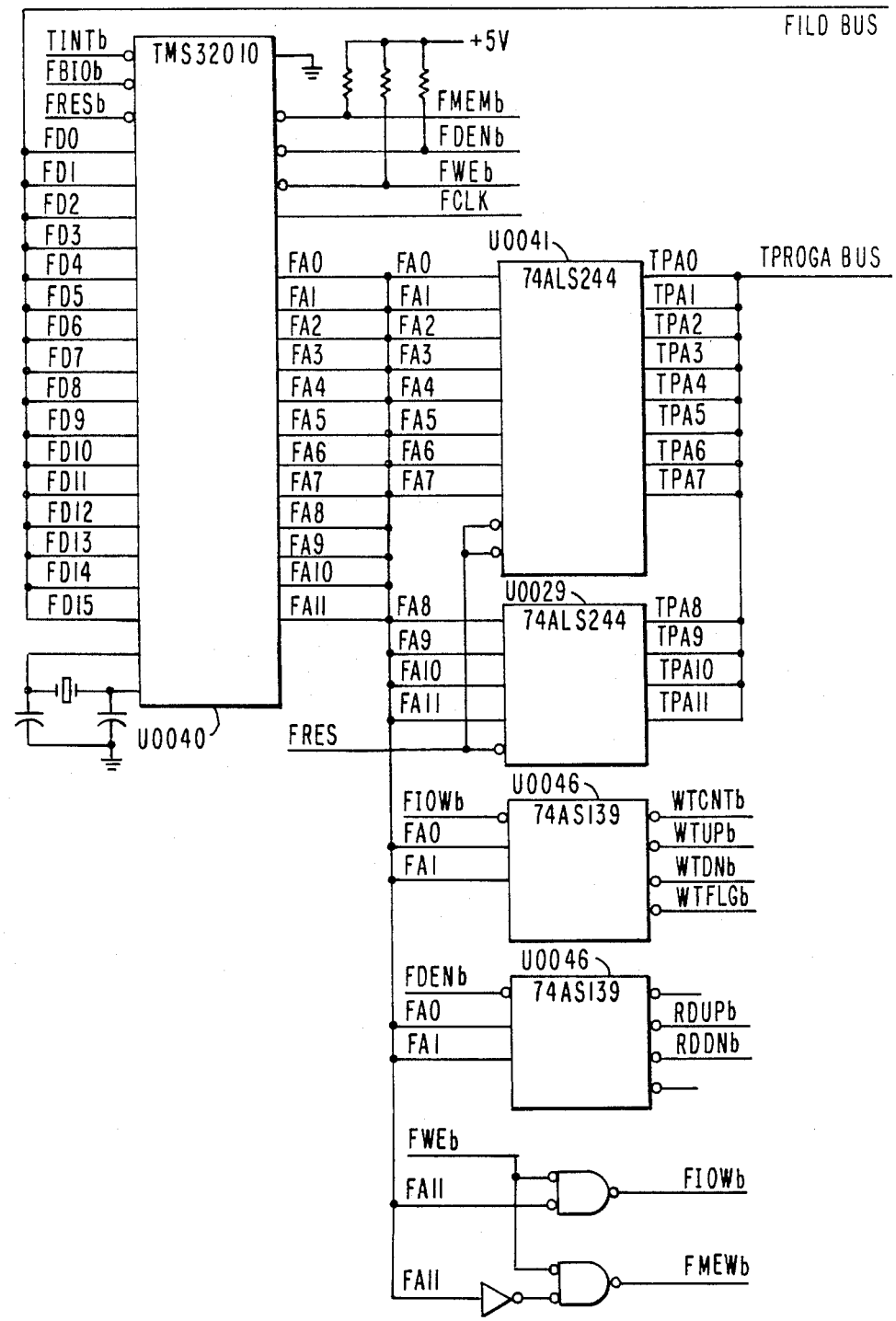
Figures 2, 9A:
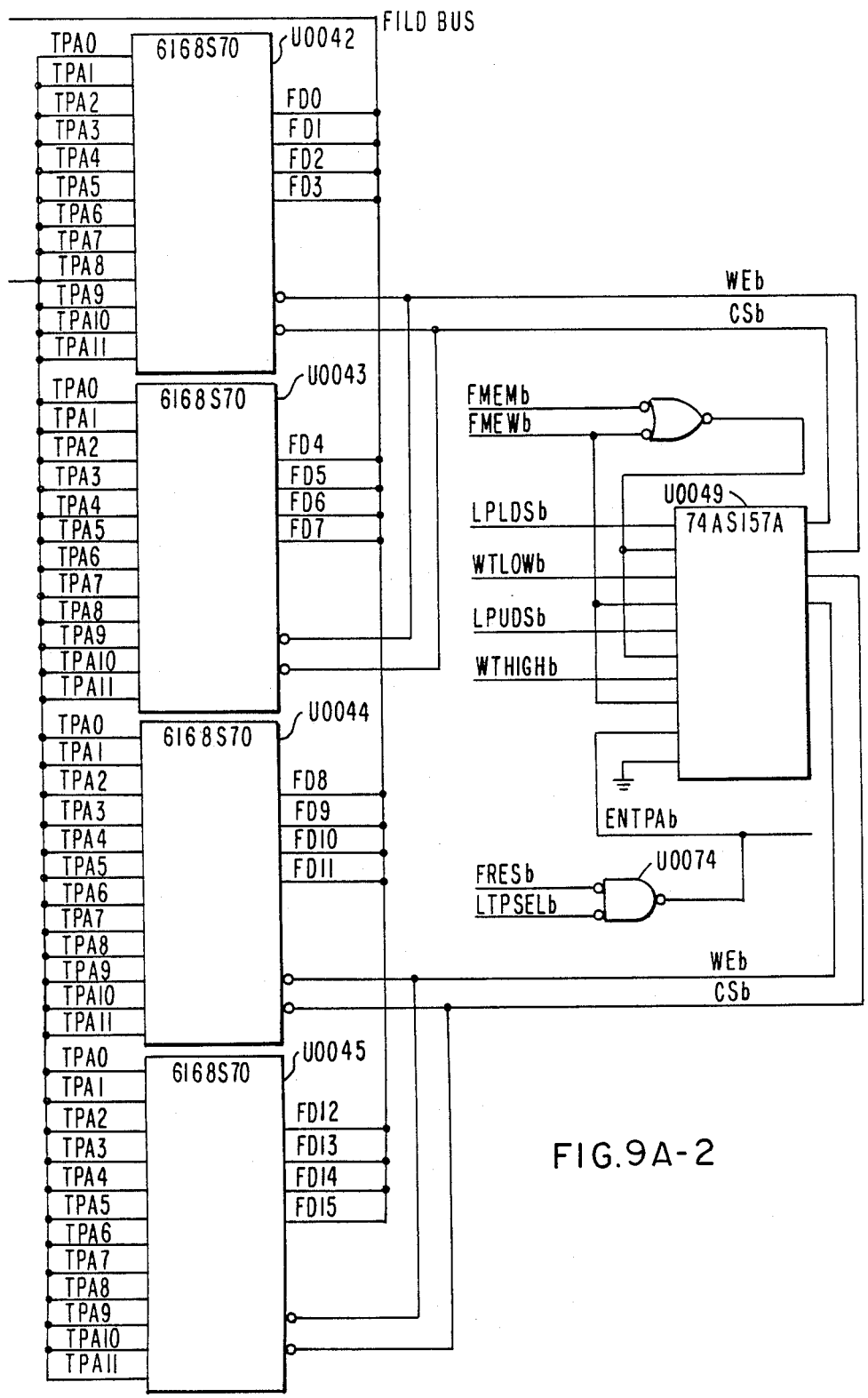

The system control signal group in FIG. 9A-1 consist of a reset signal (RESb), an interrupt signal (INTb) and a branch control status input signal (BIOb). The RESb signal is asserted low to force initialization of the TMS 320 designated U0040. The TMS 320 data bus is held in the tri-state condition during the time that RES is asserted. However, note that the address bus is always actively driven by the TMS 320, even during assertion of RESb. The INTb signal is used by external devices to indicate requirement for interrupt service. Interrupts are recognized by the TMS 320 by applying a signal with a negative going edge to the INTb pin. The TMS 320 further requires that the signal be asserted low for a minimum of one clock cycle flowing the negative transition. The BIOb signal input pin is used for program branch control. If the BIOb signal is low asserted upon execution of the BIOZ instruction, the TMS 320 will transfer program control to the address specified by the instruction.

SERVO CONTROL DATA MANAGEMENT AND CALCULATIONS INTERFACE

THE PING-PONG OR BANK SWITCHED MEMORY

Digital interface circuitry 434 in FIGS. 8A-1, 8A-2 enables control data to be transferred to and from the servo control calculator 404 under the control of the servo control data manager 402. As previously indicated, a signal processor having fast calculating capability like the TMS 320 is very efficient at performing computation operations. However, the TMS 320 program memory or I/O operations cannot easily be suspended as required to allow concurrent memory access by the processor 402. As such, the spatial digital interface circuitry 434 is needed to enable usage of the device 404 in a coprocessor application 402. These interface circuits 434 provide the capability for the servo control manager 402 to load the program memory of the calculator 404 and provide a facility for interchange of data between the processors 402 and 404. Access to the calculator program memory by the servo control manager 402 requires the calculator 404 be in the reset condition that is the calculator reset input must be asserted. The state of the calculator reset signal, FRESb in FIG. 9A-1 is directly controllable as a latched output from the manager 402.

The primary interface for interchange of data between the processors 402 and 404 is provided by implementation of a concept referred to as bank switched memory. The bank switched memory consists of two identical, physically separate, 1K by 16-bit RAM arrays. These arrays are referred to as banks. From the data manager side, both banks are resident within the same memory address space and from the calculator side, both banks are resident within the same I/O address space. During the time that the reset signal is asserted to the calculator 404 both of the banks are controlled by the servo control manager 402, and any write to the bank memory results in writing both banks. However, a read from the bank results in reading data from the bank selected for the servo control manager 402 by the bank switch logic.

At any time that the calculator reset signal is non-asserted, ownership of one of the memory banks is associated with the servo control manager 402 and ownership of the other bank is associated with the calculator 404. Since the memory appears as a single 1K by 16-bit RAM, access to the memory by either processor is totally transparent to operations by the other processor. This provides for simultaneous access to the interface memory by both processors. Control and handshake signals are associated with switching of the bank ownership.

Four states are associated with the servo control manager/calculator interface. These states are referred to as idle, go, processing, and done. Assertion of the calculator reset signal forces the interface to be in the idle state. The interface remains in the idle state until the go state is requested by the data manager 402. Bank switching can only be effected while the interface is in the idle state. A request for bank switching, at any other time is not performed until the idle state is reached.

In operation, the servo control manager 402 writes data including commands and data in the bank memory, requests a bank switch, and sets the go state. Switching of the banks makes this information available to the calculator 404. The calculator 404 detects the go state, sets the processing state, and operates on the data, writing the results back into the bank memory. Concurrently, the servo control manager 402 can write the bank memory with the next set of commands and data transparent to the calculator operation. The calculator 404 sets the done state upon completion of the required processing. The servo control manager 402 detects the done state, forces the idle state, and switches the banks to obtain access to the calculation results.

As previously stated, the bank switch memory appears as I/O locations to the calculator 404. Limitations in the number of I/O ports available necessitates usage of circuitry external to the calculator 404 for efficient usage of the bank switch memory. Four of the eight calculator I/O ports are associated with the bank switch memory and handshake flags. Address generation for access to the memory by the calculator 404 is provided by a binary up/down counter U0070, U0071 and U0072 as shown in FIG. 9D-1. The counter is operated in either post-decrement or post-increment mode. Execution of an output to port 0 results in the counter being loaded with the data value being output. This data value then serves as the bank memory address for the next bank memory operation. I/O ports 1 and 2 (associated with address lines 1 and 2 in software) are used for actual interchange of data with the bank memory. Operations on I/O port 1 result in either reading or writing of the bank memory with a post-increment of the memory address. Operations on port 2 result in either reading or writing of the bank memory with a post-decrement of the memory address. Thus, the memory address counter need only be preset with an address at the beginning of a series of read or write operations.

The TMS 320 BIOb pin and I/O port 3 are associated with the handshake interface with the 68000. The 68000 request the TMS 320 enter the GO state by outputting a hexidecimal data value of XXX1 to address 7EA07. This forces the TMS 320 BIOb signal pin in FIG. 9A-1 the a logical "1". The TMS 320, under software execution, acknowledges reception of the "go" state by outputting a data value of XXX1 to I/O port 3. This provides indication to the 68000 that the TMS 320 has entered the processing state. After completion of the required processing the TMS 320 sets the done state by outputting a XXX2 to I/O port 3. The 68000 then forces the IDLE state by outputting a XXX0 to address 7EA07. Indication of the idle state is reflected by the BIOb signal pin being at a logical "0".

Circuitry associated with the TMS 320 processor is shown in FIGS. 9A-1 through 9D-2. Circuitry shown in FIGS. 9A-1–A-2 is associated with the TMS 320 processor and program memory. Circuitry shown in FIGS. 9B-1, B-2 and 9C-1, C-2 is associated with the bank switch memory. Circuitry shown in FIGS. 9D-1, D-2 is primarily associated with bank memory addressing generation and bank switch control logic.

The TMS 320 program memory, 4K by 16-bit, is implemented with static high speed, access time of 70 nanoseconds or less, RAM provided by devices U0042 through U0045 in FIG. 9A-2. Contents of this memory must be downloaded by the 6800 before the TMS can be allowed to begin program execution. Access to the TMS 320 program memory by the 68000 is only allowed when the TMS 320 is being held reset, FRESb signal asserted. The 68000 can force the TMS 320 to be reset by writing a 0 to location 7EA01. Writing a 1 to address 7EA01 will release the reset to the TMS 320.

Assertion of the FRESb signal to the TMS 320 will force its data and control lines to the tri-state condition. However, the address lines are not tri-stated. Therefore, address buffers, devices U0041 and U0029 in FIG. 9A-1 are required to permit access to the program memory by the 68000. The TMS 320 provides three signals for external indication of the operation being performed. These signals are FMEMb, which is asserted for indication of a program memory read operation; FDENb, which is asserted for indication of an I/O read operation; and FWEb, which is asserted for indication of either a program memory or I/O write operation.

It is to be noted that circuitry external to the TMS 320 on the SCM supports program memory write operations by the TMS 320. However, since only one control signal, FWEb, is provided for external indication of a write operation, external address decoding is required to differentiate between program memory and I/O write operations. On the SCM, any write operation with the TMS 320 address bus bit A11 at a logical "1" is interpreted as a program memory write operation, and correspondingly, any write operation with A11 at a logical "0" is interpreted as a write to the I/O port address selected by address bus bits A0 through A2. Program memory write operations are performed through execution of the table write instruction. The memory devices used for implementation of the TMS 320 program memory provide two input control signals, write enable, WEb, and chip select, CSb in FIG. 9A-2. A memory read operation is performed by assertion of the CSb signal with the WEb signal non-asserted. A memory write operation is performed by assertion of both control signals. It is to be noted these devices do not provide an output enable signal. Therefore, assertion of CSb and WEb during memory write operations must be essentially coincident in order to prevent data bus contention between the memory devices and the data bus drivers.

The circuitry shown in FIG. A4 of the schematics consisting of U0049, U0048, and U0074 provides control signal interface to the TMS 320 program memory. This circuitry multiplexes the TMS 320 program memory control signals between either the 68000 or the TMS 320, depending on the state of the TMS 320 reset signal, FRESb. Byte operations from the 68000 are supported. The signal ENTPAb being in the logical "0" state indicate that the 68000 is attempting to access the TMS 320 program memory with the TMS 320 reset. This allows the 68000 write high, WTHIGHb, and write low, WTLOWb, signals shown in FIG. 9A-2 to be multiplexed to the write enable inputs of the respective bytes of TMS 320 program memory. This also allows the 68000 data strobe signals, LPUDSb and LPLDSb to be multiplexed the chip enable inputs of the respective bytes of the TMS 320 program memory. ENTPAb being in the logical "1" state selects the TMS 320 related control signals for multiplexing to the TMS 320 program memory control lines. The write enable input to both bytes will then be asserted whenever the FMEWb signal is asserted, and the chip enable input will be asserted whenever either FMEMb or FMEWb is asserted.

The TMS 320 provides for implementation of 8 I/O ports. The SCM implementation utilizes 4 of these I/O ports for operations related to the bank memory. No attempt is made to fully decode the I/O port addresses. As such, the 4 unused ports overlap the 4 used ports. That is, for example, TMS 320 operations on part 0 or port 4 will; result in the same function being performed. Device U0046, shown in FIG. 9A-1, is used to provide decoding of the TMS 320 port address for I/O operations. This device decodes the TMS 320 least significant two address signal lines to provide the decoded bank memory related control signals.

Figures 1, 9B:
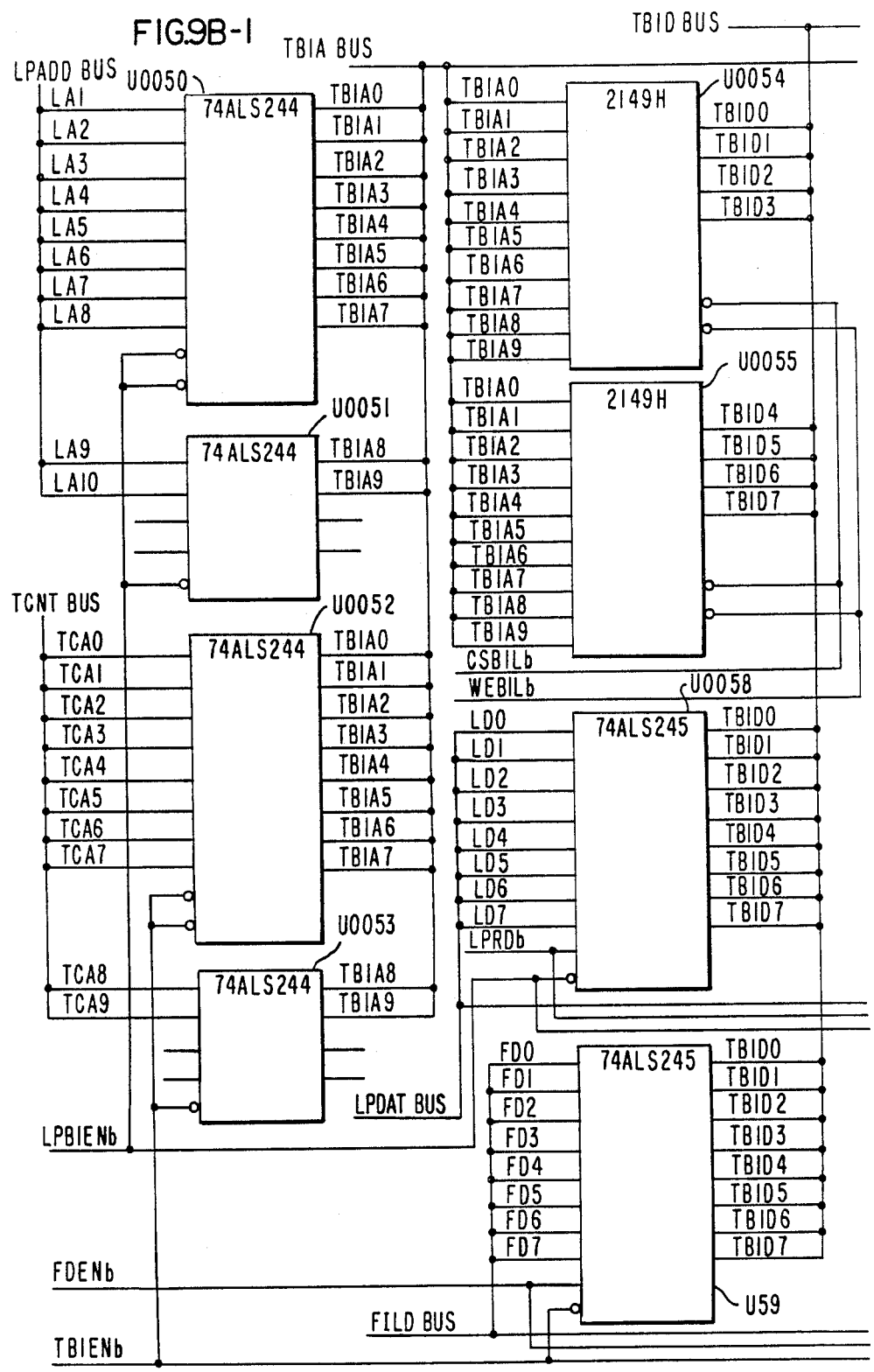
Figures 2, 9B:
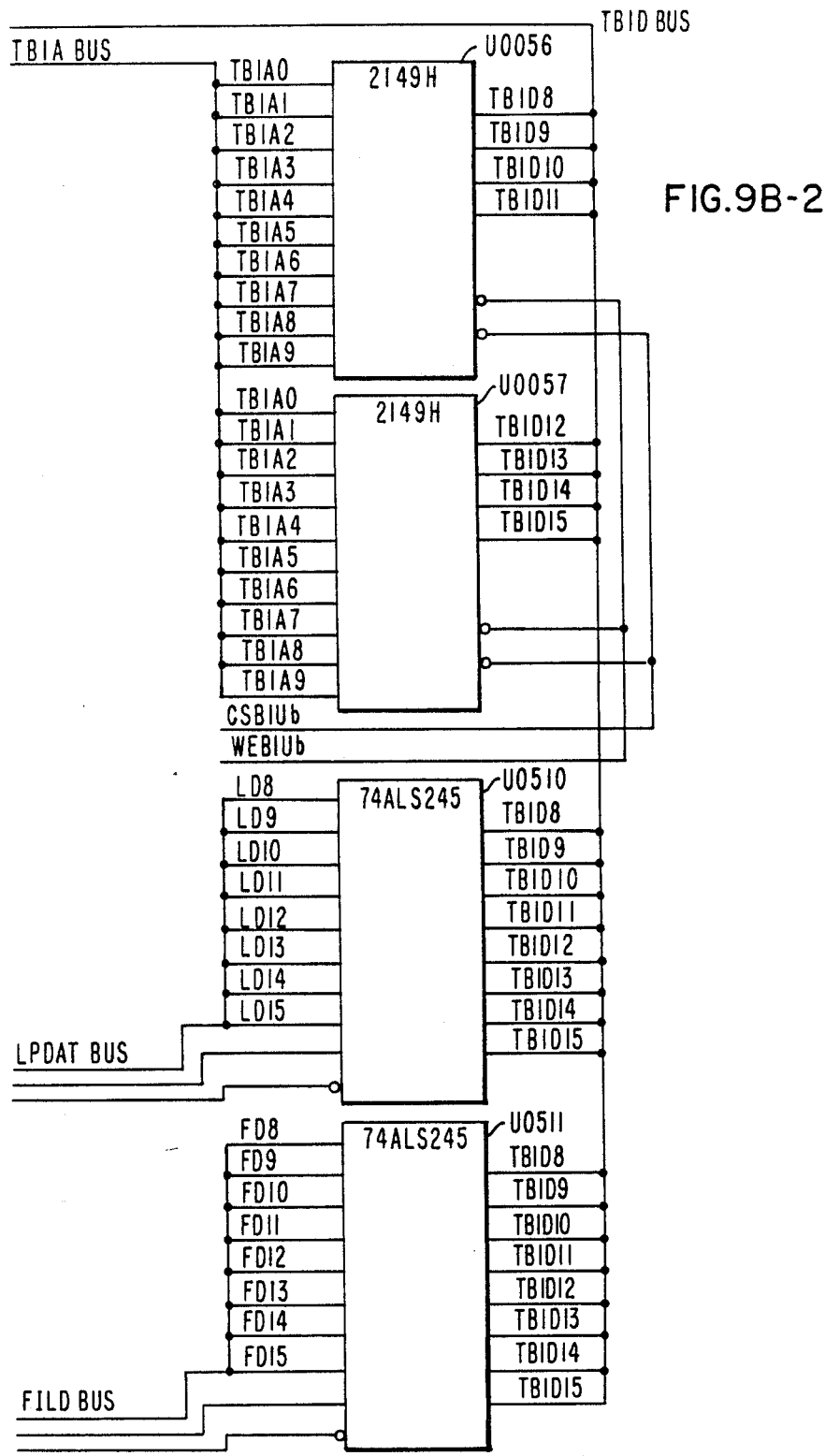
Figures 1, 9C:
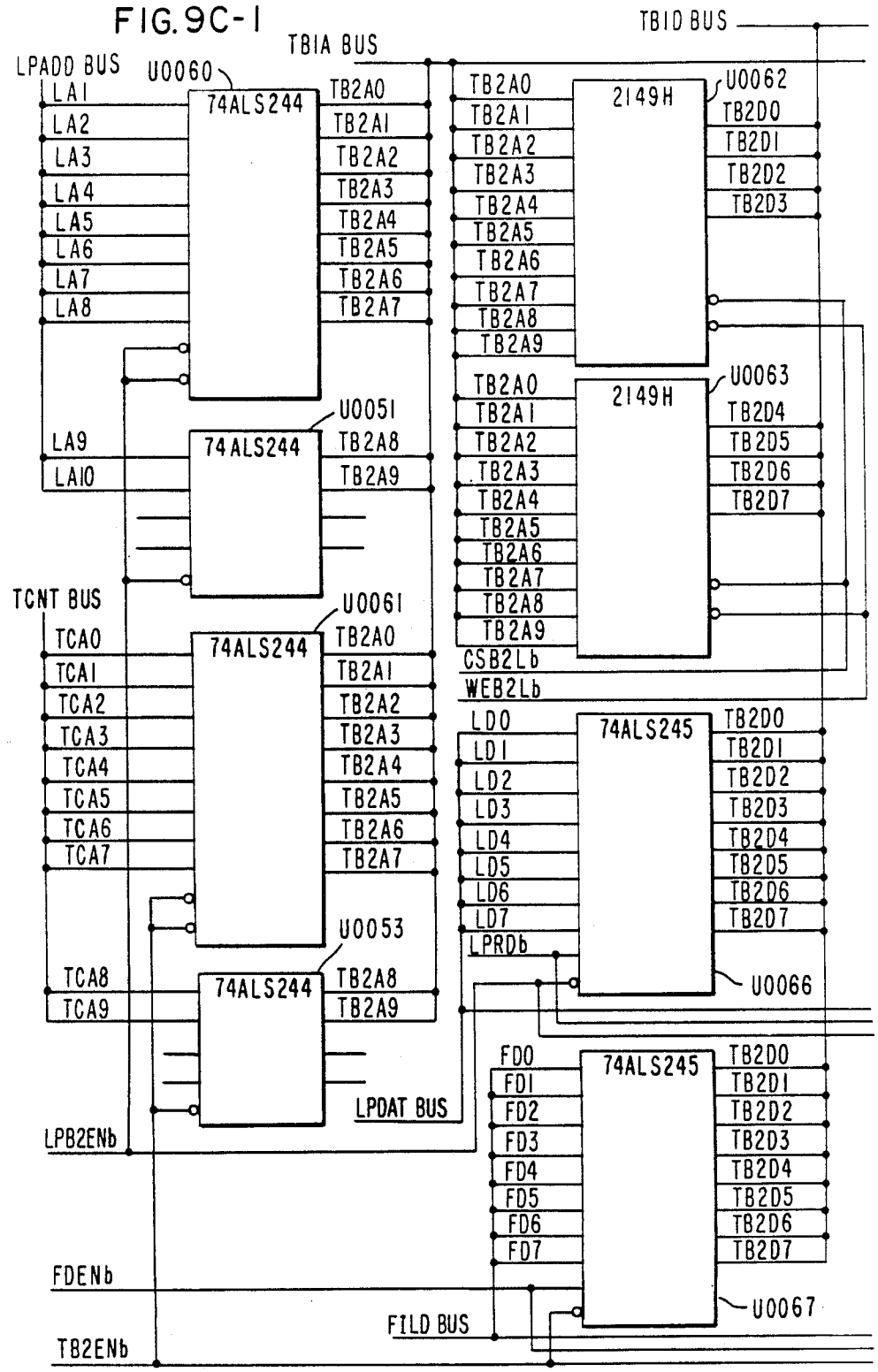
Figures 2, 9C:
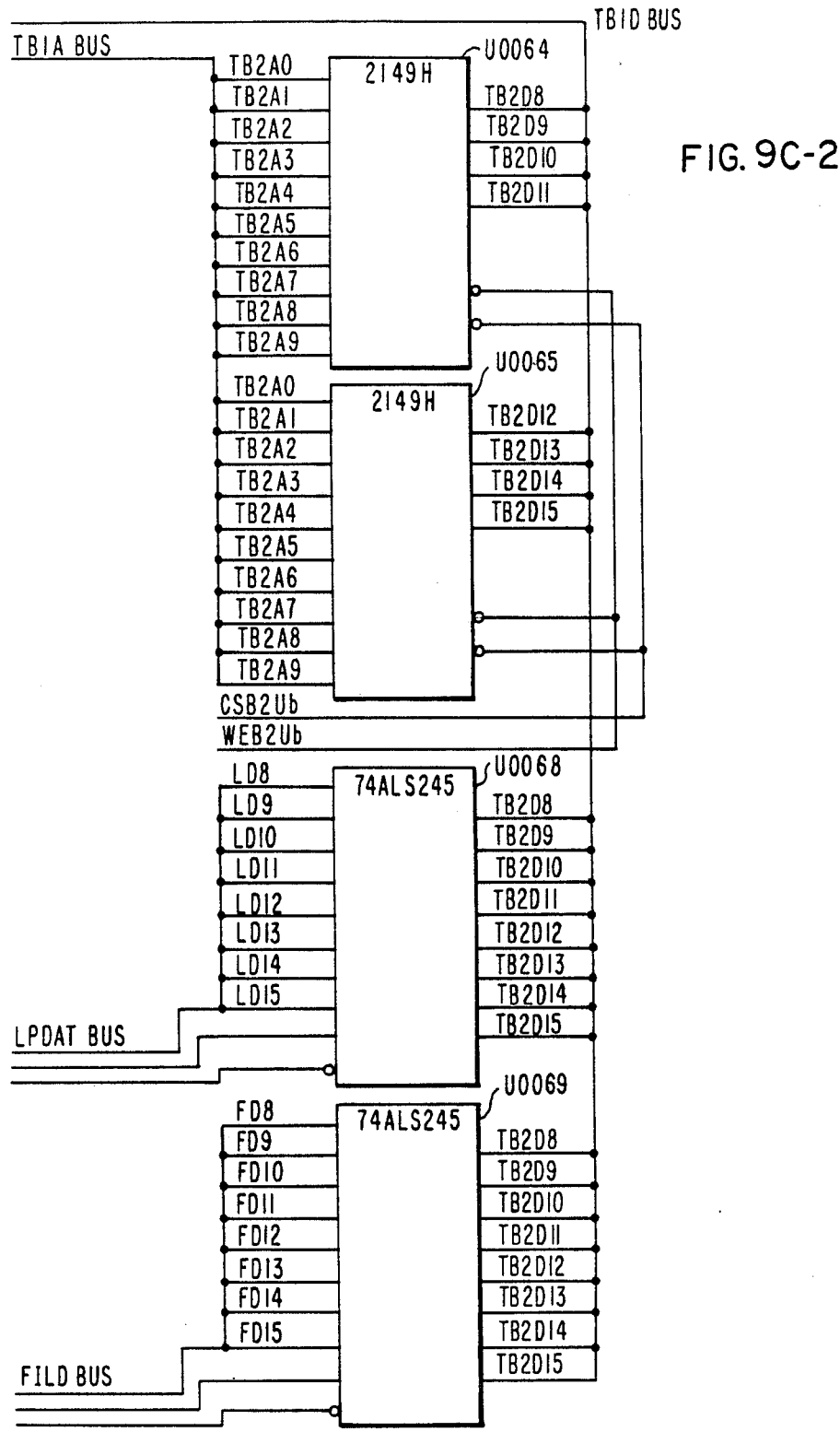
Figures 2, 9D:
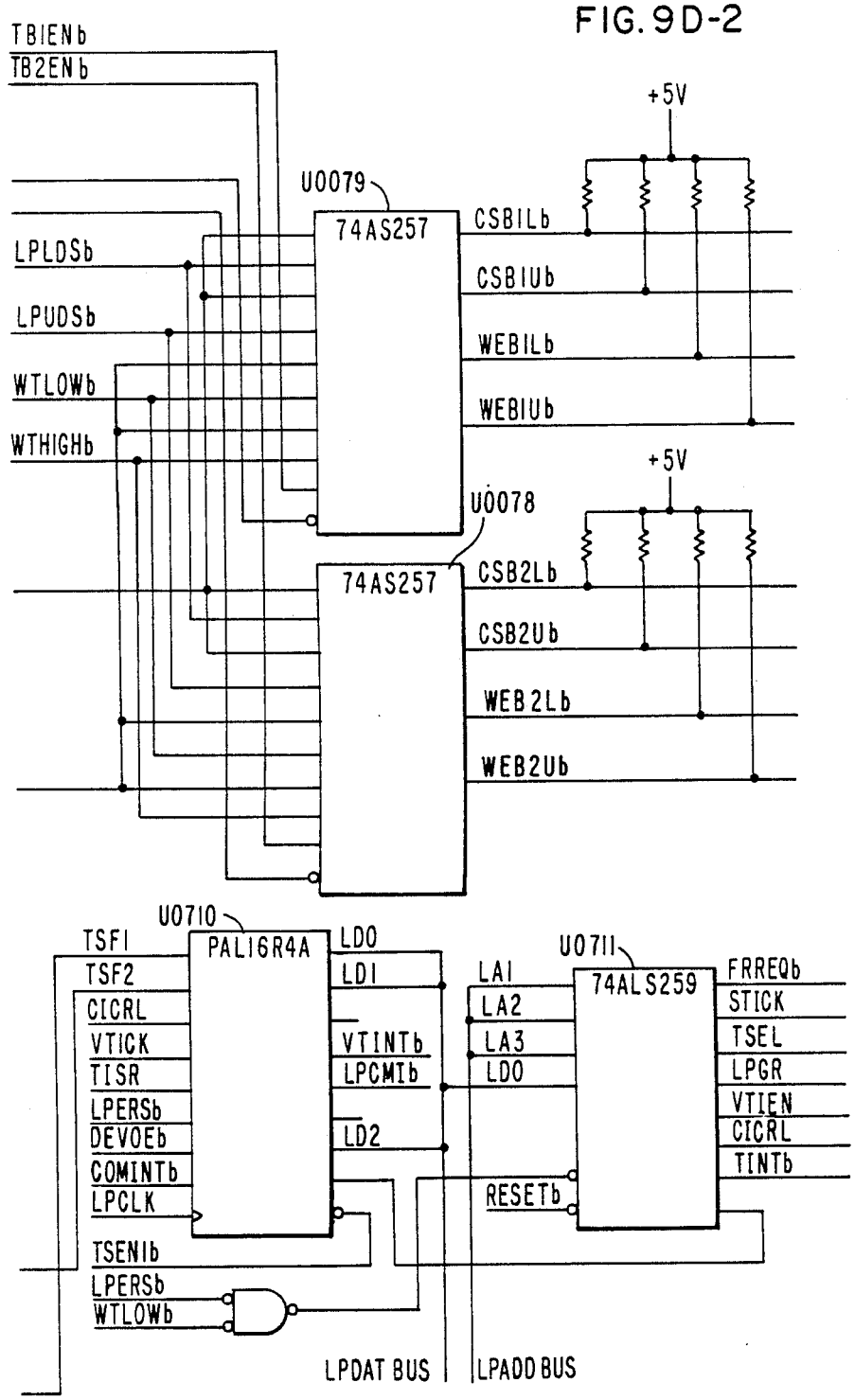

The bank memory is shown in FIGS. 9B-1, 9B-2 and control 9C-1, 9C-2 and signal and bank switch logic is shown in FIGS. 9D-1, 9D-2 and it operates as previously described for the TP board 600.

The signal VTIEN from U0711 in FIG. 9D-2 provides an input to the "system go" PAL device. This signal being in the logical one state indicates that transitions from the logical "0" to the logical "1" state of VTICK are to produce interrupts. It also indicates that the watch dog timer is to be enabled.

What is claimed is:

1. A digital control for a robot operating at a predetermined control sampling rate and having a plurality of joints with each joint being driven by an electric motor, said control comprising:

a power amplifier operable to supply drive current to each joint driving motor;

respective feedback control loop means for respectively controlling said power amplifier for each of said joint driving motors;

each of said feedback control loop means including at least one control loop operable to control the associated power amplifier and thereby control at least one control variable selected from position, velocity and torque;

at least first servo control means for performing control support tasks and calculation tasks for said control loop for all of the joint driving motors;

said first servo control means including a first microprocessor for performing calculation tasks including computing output control commands from stored algorithms for said one control loop for each joint driving motor;

said first microprocessor having a relatively high computing performance capability and a relatively low data processing interface capability;

said first servo control means further including a second microprocessor for supervising the operation of said first servo control means and performing servo control support tasks in said one control loop for each joint driving motor including the routing of control command, status and feedback data to and from said first microprocessor;

communication means for interfacing said first and second microprocessors relative to each other and relative to higher and lower level control circuitry so as to enable siad first servo control means to operate said one control loop for each joint driving motor and control the at least one control variable for said one control loop;

said communication interfacing means including a first memory bank and a second memory bank;

means for concurrently cross-coupling said first microprocessor to one of said banks, to write command and feedback data thereto and to read calculated control data therefrom, and for concurrently cross-coupling said second microprocessor to the other of said banks to read command and feedback data therefrom and to write calculated control data thereto; and means for cyclically cross-switching said microprocessors and said banks at the control sampling rate, without impacting the control processing performance of either microprocessor, so that said first microprocessor can supply new control calculations cosynchronously with the execution of said second microprocessors' supervisory tasks for control loop operation based on new control commands and feedback data in each control cycle.

2. A robot control as set forth in claim 1 wherein said first servo control means performs tasks for both position and velocity control loops with said first microprocessor performing calculation tasks for both loops and said second microprocessor performing control support tasks for both loops.

3. A robot control as set forth in claim 1 wherein said first servo means performs tasks for a torque control loop.

4. A robot control as set forth in claim 2 wherein second servo control means are provided for performing control support tasks and calculation tasks for a torque control loop for each joint driving motor, said second servo means including third and fourth microprocessors operating like said first and second microprocessors and further including another communication means structured like and operating said third and fourth microprocessors like the first defined communications means.

5. A servo control for operation in a control loop in a robot control system that operates a robot at a predetermined control sampling rate and having multiple axes with each axis being driven by a respective joint motor, said servo control comprising;

a first microprocessor for performing calculation tasks including computing output control commands from stored algorithms for said one control loop for the respective joint motor;

said first microprocessor having a relatively high computing performance capability and a relatively low data processing interface capability;

said first servo control means further including a second microprocessor for supervising the operation of said first servo control means and performing servo control support tasks in said one control loop for the respective joint motor including the routing of control command, status and feedback data to and from said first microprocessor;

communication means for interfacing said first and second microprocessors relative to each other and relative to higher and lower level control circuitry so as to enable said first servo control means to operate said one control loop for the respective joint motor and provide the output control commands for said one control loop;

said communiction interfacing means including a first memory bank and a second memory bank adapted to be synchronously cross-coupled with said first and said second microprocessors;

means for cross-coupling said first microprocessor to one of said banks to write command and feedback data thereto and to read calculated control data therefrom and for cross-coupling said second microprocessor to the other of said banks to read command and feedback data therefrom and to write calculated control data thereto; and means for cyclically cross-switching said microprocessors and said banks at the control sampling rate so that said first microprocessor can supply new control calculations, with zero wait state delays for said second microprocessor, for control loop operation based on new control commands and feedback data in each control cycle.

6. A servo control as set forth in claim 5 wherein said first microprocessor performs torque loop calculations to generate voltage commands from torque commands and motor drive current feedback handled by said second microprocessor for all of the robot axes.

7. A servo control as set forth in claim 5 wherein said first microprocessor performs position and velocity loop calculations to generate torque commands from position commands and position and velocity feedback handled by said second microprocessor for all of the robot axes.

* * * * *